US008655826B1

(12) United States Patent
Drewry et al.

(10) Patent No.: US 8,655,826 B1
(45) Date of Patent: Feb. 18, 2014

(54) PROCESSING AND ACTING ON RULES FOR CONTENT RECOGNITION SYSTEMS

(75) Inventors: Raymond G. Drewry, Wycombe (GB); James L. Helman, San Carlos, CA (US); Craig H. Seidel, Palo Alto, CA (US)

(73) Assignee: Motion Picture Laboratories, Inc., Palo Alto, CA (US)

( * ) Notice: Subject to any disclaimer, the term of this patent is extended or adjusted under 35 U.S.C. 154(b) by 680 days.

(21) Appl. No.: 12/533,572

(22) Filed: Jul. 31, 2009

Related U.S. Application Data

(60) Provisional application No. 61/085,415, filed on Aug. 1, 2008.

(51) Int. Cl.
*G06F 17/00* (2006.01)
(52) U.S. Cl.
USPC .......................................................... 706/48
(58) Field of Classification Search
None
See application file for complete search history.

(56) References Cited

U.S. PATENT DOCUMENTS

| | | | |
|---|---|---|---|
| 6,236,971 B1 | 5/2001 | Stefik et al. | 705/1 |
| 6,910,022 B2 | 6/2005 | Stefik et al. | 705/50 |
| 7,363,278 B2 | 4/2008 | Schmelzer et al. | 705/67 |
| 2003/0037010 A1 | 2/2003 | Schmelzer | 705/67 |
| 2003/0125976 A1 | 7/2003 | Nguyen et al. | 705/1 |
| 2003/0144869 A1 | 7/2003 | Fung et al. | 705/1 |
| 2003/0225698 A1 | 12/2003 | Stefik et al. | 705/51 |
| 2004/0019546 A1 | 1/2004 | Ta et al. | 705/35 |
| 2004/0024670 A1 | 2/2004 | Valenzuela et al. | 705/35 |
| 2004/0034582 A1 | 2/2004 | Gilliam et al. | 705/31 |
| 2004/0220878 A1 | 11/2004 | Lao et al. | 705/51 |
| 2004/0267552 A1 | 12/2004 | Gilliam et al. | 705/1 |
| 2005/0149450 A1 | 7/2005 | Stefik et al. | 705/58 |
| 2006/0143133 A1* | 6/2006 | Medvinsky | 705/59 |
| 2007/0050175 A1 | 3/2007 | Schmelzer et al. | 702/186 |
| 2007/0162400 A1 | 7/2007 | Brew et al. | 705/59 |
| 2007/0180523 A1 | 8/2007 | Jablonski et al. | 726/22 |
| 2007/0185815 A1 | 8/2007 | Boccon-Gibod et al. | 705/51 |
| 2007/0189530 A1 | 8/2007 | Liang et al. | 380/200 |
| 2007/0268163 A1* | 11/2007 | Aydar et al. | 341/51 |

(Continued)

FOREIGN PATENT DOCUMENTS

| | | | |
|---|---|---|---|
| WO | WO 2004/044820 | 5/2004 | G06F 21/00 |
| WO | WO 2005/114569 | 12/2005 | G06T 1/00 |
| WO | WO 2008/023307 | 2/2008 | G06F 21/00 |

OTHER PUBLICATIONS

Park, S hin and Rhee, "Design of a Secure Digital Contents Delivery system in P2P Networks",Springer-Verlag, Berlin, DRMTICS-2005, LNDS 3919, pp. 311-321, 2006.*

(Continued)

*Primary Examiner* — Kakali Chaki
*Assistant Examiner* — Walter Hanchak
(74) *Attorney, Agent, or Firm* — Dov Rosenfeld; INVENTEK

(57) ABSTRACT

A method and a computer-readable storage medium configured with instructions that when executed to carry out the method, and a computer system configured to carry out the method. The method includes storing a set of rules in computer-interpretable form in a processing system. The rules allow the expression of a range of possibilities for determination of recognition of items of content and a wide range of actions to take when such determination is made. Using the rules, a processing system can recognize content and possibly act on the recognition results, the recognition and acting according to the stored set of rules.

33 Claims, 38 Drawing Sheets

(56) References Cited

U.S. PATENT DOCUMENTS

| | | | |
|---|---|---|---|
| 2008/0109912 A1 | 5/2008 | Rivera | 726/30 |
| 2008/0140433 A1* | 6/2008 | Levy et al. | 705/1 |
| 2008/0298591 A1* | 12/2008 | Bradley et al. | 380/277 |

OTHER PUBLICATIONS

Greveler, "Enforcing Regional DRM for Multimedia Broadcasts with and Without Trusted Computing",Springer-Verlag, Berlin, DRMTICS-2005, LNDS 3919, pp. 311-321, 2006.*

Kang and Lee, Rule Identificaiton from Web Pages by the XRML Approach, Decision Support Systems, vol. 41, 2005, pp. 205-277.*

Kang and Lee, "Rule Identification from Web Pages by the XRML Approach", Decision Support Systems, vol. 41, 2005, pp. 205-277.*

"ACNS and Infringement XML Schema Info." Motion Picture Technology Office. Retrieved May 6, 2008 <http://mpto.unistudios.com/xml/>.

V. Venkatachalam, L. Cazzanti, N. Dhillon, and M. Wells, "Automatic identification of sound recordings." *IEEE Signal Processing Magazine*. vol. 21, Issue 2, Mar. 2004, pp. 92-99.

C. Busch, W. Funk, and S. Wolthusen, "Digital Watermarking: From Concepts to Real-Time Video Applications." *IEEE Computer Graphics and Applications*. vol. 19, Issue 1, Jan. 1999, pp. 25-35.

P. Cano, E. Batlle, T. Kalker, J. Haitsma, "A review of algorithms for audio fingerprinting." *2002 IEEE Workshop on: Multimedia Signal Processing*. Dec. 2002, pp. 169-173.

"Universally Unique Identifier." *Wikipedia*. Nov. 6, 2007. Retrieved Jul. 11, 2009 <http://web.archive.org/web/20071111175318/http://en.wikipedia.org/wiki/UUID>.

E. Muharemagic and B. Furht. "Survey of Watermarking Techniques and Applications." Department of Computer Science and Engineering, Florida Atlantic University. Retrieved Jul. 17, 2008 <http://www.cse.fau.edu/~borko/Chapter7,%20Hdbk%20of%20MM%20Security.pdf>.

N. Nikolaidis and I. Pitas. "Image and video fingerprinting for digital rights management of multimedia data." *International Symposium on Intelligent Signal Processing and Communications, 2006. ISPACS '06*. Dec. 2006, pp. 801-807.

W. Ku and C.H. Chi. "Survey on the Technological Aspects of Digital Rights Management." *Proceedings of the 7th Information Security Conference (ISC'04)*. Sep. 2004, pp. 391-403.

J. Bormans and K. Hill. "MPEG-21 Overview v.5." *Organisation Internationale De Normalisation ISO/IEC JTC1/SC29/WG11 Coding of Moving Pictures and Audio*. Retrieved Jul. 27, 2008 <http://www.chiariglione.org/mpeg/standards/mpeg-21/mpeg-21.htm>.

"XrML 2.1 Technical Overview." *ContentGuard Holdings, Inc*. May 20, 2002. Retrieved Jul. 27, 2008 <http://xml.coverpages.org/XrMLTechnicalOverview21-DRAFT.pdf>.

"Nextracker™ Web Monitoring." Thomson. Retrieved Jul. 20, 2008 <http://www.thomson.net/GlobalEnglish/Products/content-tracking-and-security/nextracker/nextracker-web-monitoring/Pages/default.aspx>.

"Principles for User Generated Content Services." *User Generated Content Services*. Retrieved Jul. 30, 2008 <http://www.ugcprinciples.com>.

K. Coyle. "Rights Expression Languages: A Report for the Library of Congress." Feb. 2004. Retrieved Jul. 27, 2008 <http://www.loc.gov/standards/relreport.pdf>.

"Mediahedge Platform." *Mediahedge*. 2008. Retrieved Jul. 19, 2008 <http://www.mediahedge.com/technology/platform>.

"Mediahedge Fingerprinting." *Mediahedge*. 2008. Retrieved Jul. 19, 2008 <http://www.mediahedge.com/technology/fingerprinting>.

"Video Fingerprinting." *Koninklijke Philips Electronics N.V*. Retrieved Feb. 20, 2007 <http://www.philips.com/ci>.

"Tracking and Security Technologies." Thomson. Retrieved Jul. 20, 2008 <http://www.thomson.net/GlobalEnglish/research/technology/tracking%20and-security-technologies.html>.

"Cryptographic hash function." *Wikipedia*. Retrieved Jul. 7, 2009 <http://en.wikipedia.org/wiki/Cryptographic_hash_function>.

* cited by examiner

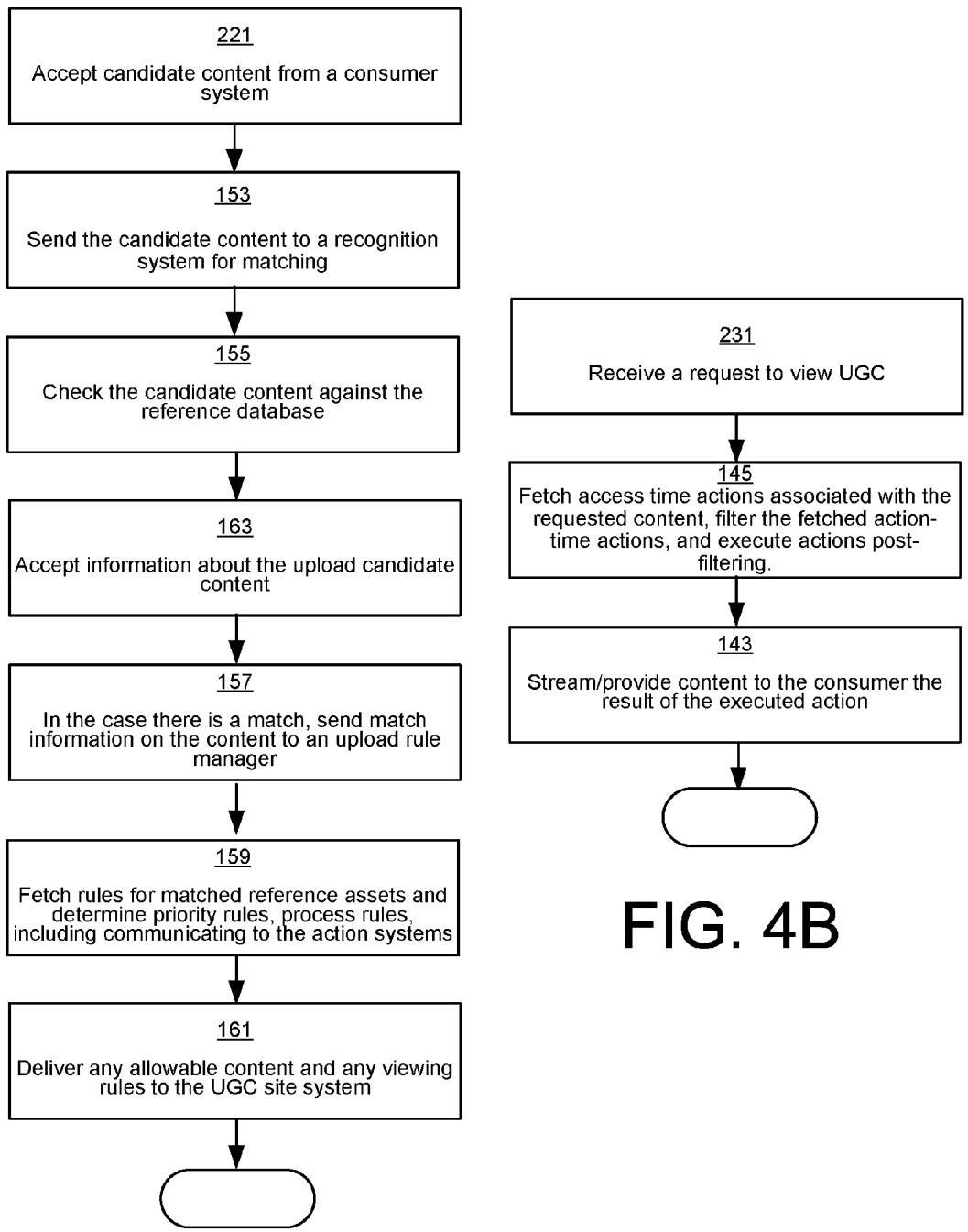

| Element | Attribute | Definition | Value |
|---|---|---|---|
| RuleList | | | |
| | version | Current version is 1 | Integer |
| | revision | Current revision is 1 | Integer |
| RuleListName | | Name for this set of rules; intended for incorporation into human-readable logs and statistical analysis | String |
| | version | Optional version number for this list of rules; no default | Integer |
| | revision | Optional revision number for this list of rules; no default | Integer |
| RuleListCreationTime | | Creation time for this RuleList | XML DateTime |
| RuleListID | | Identifier for this RuleList internal to the supplier of the list. It is intended to be something that is easier to use in automated handling of notifications and ingestion status than the RuleListName | String |
| RuleListValidDuration | | Period for which this RuleList applies. If not present, the RuleList is always valid. | See TimeInterval element |
| SiteConcerned | | Informational field describing the site for which the rules are intended (if known.) | URI |
| Owner | | Information about the content owner. | See Owner element |
| AssetList | | Contains one or more assets to which the Rules apply. The file is valid if this is not present. See the Templates section. | See Asset Element |
| Rule | | One or more individual Rule elements.<br><br>If no rules are specified, no actions are taken on detection. This makes it possible to accept original assets that don't require detection rules without requiring a different ingestion path – everything has a rules file. | See Rule Element |

FIG. 5

| Element | Attribute | Definition | Value |
|---|---|---|---|
| Asset | | | |
| OriginalAssetName | | Convenience field for human readability | String |
| OriginalAssetID | | A way of uniquely identifying a piece of content. See 'Required External Data' section. | Type-specific – see "ID Types and ID Values" table |
| | type | Type of the ID. | "ISAN", "UUID", "Coral", or site- or vendor-specific string. |
| AlternateURL | | Used by the AlternateContent action (q.v.) | URL |
| AlternateInfo | | Used by the AlternateContent action (q.v.) | any |
| Group | | An asset may belong to 0 or more groups | See Group Element |

FIG. 6

| ID type | ID value |
|---|---|
| ISAN | An <ISAN> element, as specified in ISO15706-2 Annex D. |
| UUID | A UUID in the form 8-4-4-4-12 |
| URI | A URI; this allows compatibility with TVAnytime and MPEG-21 |
| Grid | A Global Release identifier for a music video; exactly 18 alphanumeric characters |
| ISRC | International Standard Recording Code for music videos; exactly 12 alphanumeric characters |
| Coral | A Coral <Resource> element, as specified in Coral Core Architecture Specification, Version 4.0, §2.5.3 |
| Other | An owner-specific string; this should be unique at least within the context of assets from a particular owner, and globally unique when concatenated with the OwnerDomain field of the Owner element. |

FIG. 7

| Element | Attribute | Definition | Value |
|---|---|---|---|
| Owner | | | |
| Name | | Name of the owner | String |
| OwnerDomain | | Domain associated with the owner, used as a way of uniquely identifying the owner. National subsidiaries of studios may still call themselves 'StudioName' rather than 'StudioName France' but stdioname.com and studioname.fr are unambiguous. | A domain name; informally, the second part of a URI. |
| Email | | General administrative email address to use if others not present or appropriate | String |
| *EmailTakeDownNotifications* | | Email address for notifying the owner about TakeDown | String |
| *EmailReportToOwner* | | Email address for notifying the owner about ReportToOwner actions | String |
| *EmailQuarantine* | | Email address for notifying about Quarantine actions | String |
| *EmailLeaveUp* | | Email address for notifying about LeaveUp actions that require further action. | String |
| *EmailConflicts* | | Email address to use for conflicts on rule execution | String |
| *EmailLog* | | Email address for sending batched results of the Log action. | String |
| Phone | | Phone number with country code; multiple allowed | String |
| *Geography* | | Describes the geographies for which the owner has exploitation rights.<br>This can be used for certain kinds of performance optimization (knowing when rules do or don't have to be checked) and for certain kinds of ingestion-time conflict resolution (See 3.3.7.1).<br>If not present, the owner has rights everywhere. | See CountryList element |
| *Extra* | | Optional opaque information supplied by and used by the owner; it is never used by the content rules system except as data to return back to the owner. | String(4096) |

FIG. 8

| Element | Attribute | Definition | Value |
|---|---|---|---|
| TimeInterval | | | |
| | *start* | Start time of the interval; if not present, it is infinitely far in the past | XML Date Time |
| | *end* | End time of the interval; if not present, it is infinitely far in the future. | XML Date Time |
| | *duration* | If this is the only element present, it is duration from now. If present with start, End is computed as start+duration. If present with end, Start is computed as end − duration. If present with both, it is ignored. | XML duration |

FIG. 9

| Element | Attribute | Definition | Value |
|---|---|---|---|
| TimecodeRange | | | |
| SegmentStart | | Start time of the range, relative to the start of the asset | A timecode of the form HH:MM:SS:FF@ff. Where HH is hours, MM is minutes, SS is seconds, FF is a frame within that second, and ff is a frame rate. |
| SegmentEnd | | End time of the range, relative to the start of the asset | A timecode of the form HH:MM:SS:FF@ff. Where HH is hours, MM is minutes, SS is seconds, FF is a frame within that second, and ff is a frame rate. |

FIG. 10

| Element | Attribute | Definition | Value |
|---|---|---|---|
| Group | | | Type-specific – see "ID Types and ID Values" table |
| | type | Domain within which the id is to be evaluated (and within which it must be unique.) | "UUID", "ISAN", "URI", or "Other" |
| | *name* | Name of the group | String |

FIG. 11

| Element | Attribute | Definition | Value |
|---|---|---|---|
| Rule | | | |
| | *name* | Optional identifier for this rule. It is provided to any actions triggered in this rule. | String |
| | *priority* | If the detection criteria for more than one rule are met, the actions for the highest priority rule or rules get triggered. | Integer 1-100.<br>100 is highest priority, 1 lowest |
| | *matchedComponents* | Some rules may be different based on whether the site asset matches an original in audio, video, or both. A rule is triggered only if the matched components 'match' (loosely speaking' the ones in this attribute.<br>If not present this defaults to "any." .<br>If the recognition system cannot implement this feature, it should be treated as "any".<br>The matched component types are made available to subsequent actions. | "audio", "video", "both", or "any" |
| | *alwaysProcess* | Always process this rule, whether or not the criteria are met. The priority attribute is ignored. | Boolean |
| | *ignoreWhiteList* | If this attribute is set to true, the whitelist referenced in UGCPrinciples §3.e is to be ignored for detection and actions. This may be appropriate for some content.<br>Implementation of the whitelist is outside the scope of this specification. | Boolean |
| | *generateACNS* | If this attribute is set to true, the system processing the action notifications must generate ACNS-format copyright infringement XML. See References for ACNS specification. | Boolean |
| RuleValidDuration | | Time during which this rule must be applied. If not present, this rule is always applied. | TimeInterval element |

FIG. 12A

| Element | Attribute | Definition | Value |
|---|---|---|---|
| Rule (CONTINUED) | | | |
| *IncludeSegments* | | Segments within the reference asset to be considered when doing the raw match. | One or more TimecodeRange elements |
| | | If not specified, all of the asset is implicitly included. | |
| *ExcludeSegments* | | Segments within the reference asset to be ignored when doing the raw match. | One or more TimecodeRange elements |
| | | If not specified, none of the asset is explicitly excluded. | |
| *DetectionCriteria* | | Criteria to apply when an asset is matched. | See DetectionCriteria Element |
| | | When a match is detected and the criteria are met, all the actions are taken. | |
| | | When a match is detected and this field is not present, all the actions are always taken, no matter what the priority of the rule. | |
| Actions | | Actions to take when the detection criteria are met. There must be at least one. | See Action Element |

FIG. 12B

| Element | Attribute | Definition | Value |
|---|---|---|---|
| DetectionCriteria | | | |
| MatchThreshold | | The level of quality or certainty that must be achieved by the underlying recognition system before this rule is applied. | |
| | | If this field is not present, it is up to one or both of recognition system and the site to decide what counts as a good enough match. | |
| | | Not all recognition system will support this parameter. If a recognition system does not have this information available, or is completely confident in its match/no match decisions, then it should provide '100' for anything it returns as a reasonable match. | |
| | percent | The level of 'sureness' that must be met for this to count as a match. | INTEGER [1-100] |
| MinLengthMatched | | The criterion is met if the amount of matching time found between the original and the site asset is greater than or equal to the specified Time. | |
| | | The time required and the time found are available to subsequent actions. | |
| | time | The amount of time that must be exceeded for the rule to trigger | XML duration |
| MinAggregateLength Matched | | As with MinLengthMatched, except that the time imputed to the site asset is taken from matches to the original asset associated with the current RuleList and all assets associated with all the Groups in the RuleList. | |
| | | The time required, time found, and details of any matched assets found through groups are available to subsequent actions. | |
| | time | The amount of time that must be exceeded for the rule to trigger | XML duration |
| MinPercentOfSiteAsse tMatching | | The criterion is met if the amount of time matched, as a percentage of the length of the local copy, is a greater than or equal to the specified Percent. | |
| | | The percent required and the percent found are available to subsequent actions | |
| | percent | The percentage of the site asset that must come from the original | INTEGER. [0-100] |

FIG. 13A

| Element | Attribute | Definition | Value |
|---|---|---|---|
| DetectionCriteria(Cont.) | | | |
| MinPercentOfSiteAsset AggregateMatching | | As with MinPercentOfSiteAssetMatching, except that the time imputed to the local copy is taken from matches to the original asset associated with the current RuleList and all assets associated with all the Groups in the RuleList. The time required, time found, and details of any matched assets found through groups are available to subsequent actions. | |
| | percent | The percentage of the site asset that must come from originals. | INTEGER. [0-100] |
| MinPercentOfOriginalA ssetMatched | | The criterion is met if the amount of an original that is matched by the copy is greater than or equal to Percent of the original. . The percent required and the percent found are available to subsequent actions. | |
| | percent | The percentage of the original that must be found in the local copy. | INTEGER. [0-100] |
| SectionMatched | | The criterion is met if at least [percent] of the content appearing in the reference asset between time [start] and time [start+length] is found in the candidate asset. | |
| | start | An implementation is not required to support finer precision that single seconds | XML duration |
| | length | An implementation is not required to support finer precision that single seconds | XML duration |
| | percent | Minimum percent of the specified section that must match for the criterion to be met | INTEGER [1-100] |
| Watermark. Detected | | This allows for detection of some standard marks. Vendor specific marks may be included in a future version (see Appendix I) | |
| | type | The watermark that needs to be detected to meet the criterion. The detected mark is made available to subsequent actions. This cares only about the payload of the watermark, not its encoding; a detection system may have multiple watermark detection systems, one for each different (usually vendor-specific) way of carrying the watermark. DCI-forensic is triggered by the 35-bit DCI mark. AACS-theatrical is triggered by the presence of the AACS "Theatrical – no home use" mark. AACS-consumer is triggered by the AACS "Consumer Mark" | "DCI-Forensic", "AACS-theatrical", "AACS-consumer" |

FIG. 13B

| Element | Attribute | Definition | Value |
|---|---|---|---|
| Actions | | A list of actions to invoke when the detection criteria are met | Any number of simple or complex actions. |

FIG. 14

| Element | Attribute | Definition | Value |
|---|---|---|---|
| CountryList | | | |
| | type | Whether the list is inclusionary or exclusionary | "include" or "exclude" |
| Country | | | ISO 3166-1 alpha-2 country code |

FIG. 15

| Element | Attribute | Definition | Value |
| --- | --- | --- | --- |
| NotifyOriginator | | This generates a request to send some form of notification to the entity represented by OriginatorID, for example an email detailing the rules infringed by the site asset that triggered the rule. | |
| Log | | This generates a request to save all the information about the execution of this rule somewhere, e.g. to a database or a log file.<br><br>The value of the tag is saved as part of the log. | String(255) |
| | assertOwnership | If this is present and set to true, the content owner may be taking no action, but is asserting legal ownership of the matched content. This assertion is saved by the logging mechanism. | Boolean |
| ReportToOwner | | This generates a request to send all the information about the execution of this rule to the persons or systems designated in the Owner element.<br><br>The value of the tag is sent as well. | String(255) |
| | assertOwnership | If this is present and set to true, the content owner may be taking no action, but is asserting legal ownership of the matched content. This assertion is sent with the report. | Boolean |

FIG. 16

| Element | Attribute | Description | Value |
|---|---|---|---|
| TakeDown | | This generates a request to make the content invisible and unavailable – no external consumer should be able to find out that it was ever there in the first place. There may be legal requirements to keep the content on the system, but quarantined, for some length of time before physically deleting it.<br><br>This is also an appropriate action from which to trigger a DMCA notice.<br><br>TakeDown is an all or nothing activity; for more nuanced actions, please see the LeaveUp and Quarantine elements. | . |
| | assertOwnership | If this is present and set to true, the content owner is asserting legal ownership of some part of the content. Some entities (e.g. law enforcement) may want content taken down without asserting ownership.<br><br>It is included in the generated Notification element and must be included in a record of TakeDown actions (see below.) | Boolean |
| CountryList | | List of countries where the asset is or is not to be removed | CountryList element |

FIG. 17

| Element | Attribute | Definition | Value |
|---|---|---|---|
| LeaveUp | | This is intended to allow initiation of a variety of activities – negotiation, expiry of legal availability windows, market tests, etc. | |
| | *assertOwnership* | Even though a decision has been made to leave the site asset available, ownership is being asserted. | Boolean |
| *LeaveUpDuration* | | Length of time for this to be left up. If not present, leave up forever. | TimeInterval |
| *CountryList* | | List of countries for which this action should be taken (or not) | CountryList |
| *ExpiryActions* | | What to do when Duration has expired | List of Simple or complex action; the list may not include another LeaveUp action. |

FIG. 18

| Element | Attribute | Definition | Value |
|---|---|---|---|
| Quarantine | | This sends a request to make the content unavailable (e.g. for downloads.) It is less draconian than TakeDown, and is intended to allow for short-term legal or commercial negotiations that eventually allow the asset to be made available, or enable monitoring of how often people try to acquire this copy of the asset.<br><br>Some systems may implement Quarantine and TakeDown with the same internal mechanism, but the legal and procedural follow-ons can be different. | |
| | *assertOwnership* | If this is present and set to true, the content owner is asserting legal ownership of some part of the content.<br><br>It is included in the generated Notification element and must be included in a record of actions taken, similarly to TakeDown. | Boolean |
| *CountryList* | | List of countries where the asset is or is not explicitly available | CountryList element |

FIG. 19

| Element | Attribute | Definition | Value |
|---|---|---|---|
| AlternateContent | | This uses fields from the Asset to provide alternate or additional content and information, for example for providing better quality video or an approved marketing trailer. | |
| | *alternateInfo* | If true, display the alternate information from the Asset element. | Boolean |
| | *alternateUrlAsLink* | If true, display a link to the alternate content; else, display the content itself | Boolean |
| | *displaySiteContent* | Display the SiteAsset if true | Boolean |
| CountryList | | Countries to explicitly include or exclude | CountryList element |

FIG. 20

| Element | Attribute | Definition | Value |
|---|---|---|---|
| OwnerAdSupported | | It may be the case that infringing content is allowed to stay up if ad space is sold around it. This action sends a request to initiate that process, as a result of which ad content is retrieved.<br><br>For this action, the content owner provides the ads. | |
| URL | | Different original assets will have different schemes for ad-supported availability, and this URL provides the necessary flexibility.<br><br>See the Notification Element for details of using this URL. | URL |
| | static | If this is true, there is no requirement for the site's system to read the URL dynamically – it can be read once at content ingestion time and cached locally, for example.<br><br>Otherwise, the URL needs to be read each time it is used, for example when a rotating series of ads is presented. | Boolean |
| *CountryList* | | Countries to include or exclude for this action | CountryList element |
| *AllowedType* | | Kinds of ads that are allowed. Multiple may be specified.<br><br>Defaults to "any" | "video-pre", "video-post",<br><br>"video-overlay", "banner", "text", "any" |

FIG. 21

| Element | Attribute | Definition | Value |
|---|---|---|---|
| SiteAdSupported | | It may be the case that infringing content is allowed to stay up if ad space is sold around it. This action sends a request to initiate that process. For this action, the site (perhaps via an ad service) provides the ads. | |
| CountryList | | Countries to include or exclude for this action | CountryList element |
| AllowedType | | Kinds of ads that are allowed. Multiple may be specified. Defaults to "any" | "video-pre", "video-post", "video-overlay", "banner", "text", "any" |

FIG. 22

| Element | Attribute | Definition | Value |
|---|---|---|---|
| License | | The UGCPrinciples allows the content to be licensed in a way of the Copyright Holder's choosing. This action sends a request to initiate that process. The results of calling the URL can't be cached, since they will almost certainly result in a generated page specific to the asset, the originator, or the operator of the local system. | |
| URL | | Different original assets will have different licensing schemes; this allows the originator or someone trying to access the content to be presented with a license agreement. See the Notification Element for details of using this URL. | URL |
| CountryList | | List of countries to explicitly include or exclude | CountryList element |

FIG. 23

| Element | Attribute | Definition | Value |
|---|---|---|---|
| Notification | | | |
| | version | Taken from original rules | |
| | revision | Taken from original rules | |
| | *ignoreWhiteList.* | Taken from the rule that triggered this action. If the attribute is present, the whitelist referenced in UGCPrinciples §3.e is ignored. | Boolean |
| | *generateACNS* | Taken from the rule that triggered this action. If the attribute is present, ACNS data gets sent as POST data to any external URLs (see above.) | Boolean |
| *RuleListName* | | Taken from original rules | String |
| | version | Taken from original rules | Integer |
| | revision | Taken from original rules | Integer |
| *RuleListCreationTime* | | Taken from original rules | XML DateTime |
| *RuleListID* | | Taken from original rules | String |
| Owner | | From the original rules | See Owner element |
| Asset | | Taken from the RuleList whose evaluation triggered the action | See Asset element |
| RuleName | | Name of the particular rule that generated this notification | String |
| | Priority | Taken from the rule; set to 100 for rules with no detection criteria | Integer 1-100 |
| *RuleListValidDuration* | | Taken from the RuleList | TimeInterval element |
| *RuleValidDuration* | | Taken from the rule | TimeInterval element |
| *IncludeSegments* | | Taken from the rule | One or more Timecode Range elements |
| *ExcludeSegments* | | Taken from the rule | One or more Timecode Range elements |
| *SiteConcerned* | | Taken from the RuleList | URI |
| SiteAsset | | Information about the site asset that matched the original | See SiteAsset element |

FIG. 24A

| Element | Attribute | Definition | Value |
|---|---|---|---|
| Notification (Contin.) | | | |
| MatchedComponents | | The components that were matched to trigger the criteria. A system that does not know how to differentiate components should return "any"; a system that identifies only one kind of component should return that component. | "audio", "video", "both", or "any" |
| OriginatorID | | How the system uniquely identifies the entity that created the site asset | String |
| | Country | The location of the originator, if known. If not present, assumed to be unknown. | ISO 3166 country code |
| Actions | | Actions to be performed. See notes above on single vs. multiple. | See Action Element |
| MatchThreshold | | Present if matchThreshold criterion was met | |
| | required | From the original rule | INTEGER [1-100] |
| | observed | Not all recognition system will support this level of granularity. If a recognition system does not have this information available, it should provide '100' for anything it returns as a reasonable match. | INTEGER [1-100] |
| LengthMatched | | Present if a length criterion was met | |
| | required | From the original rule | XML duration |
| | matched | Length of time matching between local and original | XML duration |
| AggregateLengthMatched | | Present if AggregatedLengthMatched was met | |
| | required | From the original rule | XML duration |
| | totalMatched | Total amount of the site asset matched; This should be the same as LengthDetected attribute of SiteAsset. | XML duration |
| | matchedFromThisOriginal | The amount found using the original asset to which this notification applies | XML duration |

FIG. 24B

| Element | Attribute | Definition | Value |
|---|---|---|---|
| Notification (Contin.) | | | |
| *PercentOfLocalMatched* | | Present if PercentOfLocalMatching was met | |
| | required | From the original rule | Integer [0-100] |
| | matched | Percent of local copy found in the original | Integer [0-100] |
| *PercentOfOriginalMatched* | | Present if PercentOfOriginalMatched was met | |
| | required | From the original rule | Integer [0-100] |
| | matched | Percent of the original found in the local copy | Integer [0-100] |
| *AggregatedPercentLocalMatched* | | Present if AggregatedPercentLocalMatched was met | |
| | required | From the original rule | Integer [0-100] |
| | totalMatched | The total amount of the site asset that was matched; This should be the same as LengthDetected attribute of SiteAsset. | XML duration |
| | percentFromThisOriginal | Amount of the site asset matched by this source | Integer [0-100] |
| | timeFromThisOriginal | Time in the site asset detected from this source | XML duration |
| *SectionMatched* | | Present if SectionMatched was met | |
| | start | From the original rule | XML duration |
| | length | From the original rule | XML duration |
| | percentRequired | From the original rule | INTEGER [1-100] |
| | percentMatched | Percent of the interval [start, start+length] from the reference asset found in the matched asset | INTEGER [1-100] |
| *WatermarkDetected* | | Present if WatermarkDetected was met | See WatermarkDetected element |

FIG. 24C

| Element | Attribute | Description | Value |
|---|---|---|---|
| *WatermarkDetected* | | The value of the watermark, in a canonical form | String |
| | type | The type of mark | "DCI-forensic", "AACS-theatrical", or "AACS-consumer" |

FIG. 25

| Element | Attribute | Definition | Value |
|---|---|---|---|
| SiteAsset | | Everything that is known about a site asset | |
| SiteAssetID | | How this asset is identified locally. It may be a URL, or an ID that is opaque outside of the context of the site, or anything else. | String |
| SiteDomain | | This is the site at which the SiteAsset was found (if known.). Some content owners may want different treatment for different sites; this field provides information to allow them to do that, as well as enabling certain kinds of tracking and statistics. | URL |
| *TimeCreated* | | Time the site asset was created, if known. It could, for example, be the time it was uploaded. | XML date/time |
| *TimeMatchRequested* | | Time it was decided to try to match the item in question. | XML date/time |
| TimeMatchDetected | | Time the match was detected. | XML date/time |
| Format | | The format of the site asset, reported for statistical purposes. | String, based on 'type' attribute |
| | type | "FileExtension" or "MIME" | |
| Length | | Length of the site asset | XML duration |
| LengthDetected | | Length of identified content in this asset. For aggregated matches, this is the total of all identified segments. | XML duration |

FIG. 26

| Element | Attribute | Definition | Value |
|---|---|---|---|
| RuleList | | | |
| | *templateID* | Identifier to use when referring to this RuleList as a template. | UUID |

FIG. 27

| Element | Attribute | Definition | Value |
|---|---|---|---|
| AssetsWithTemplate | | | |
| | version | Current version is 1 | Integer |
| | revision | Current revision is 1 | Integer |
| *AssetListID* | | Optional identifier; currently used only when returning status at ingestion time | String |
| *SiteConcerned* | | Informational field describing the site for which the rules are intended (if known.) | URI |
| TemplateID | | ID of the rule template to use for the assets in this AssetList. Exactly one such sub-element must be present in an AssetsWithTemplate element. | UUID |
| Owner | | | See Owner element |
| AssetList | | Contains one or more Asset elements | See Asset element |

FIG. 28

| Element | Attribute | Definition | Value |
|---|---|---|---|
| Notification | | | |
| *TemplateID* | | ID of the template used for the rule that generated this notification | UUID |

FIG. 29

```xml
<?xml version="1.0" encoding="utf-8" ?>
<!--Created with Liquid XML Studio (http://www.liquid-technologies.com)-->
<xs:schema xmlns:cor="http://www.coral-interop.org/arch/core/4-0"
       xmlns:isan="http://www.isan.org/ISAN/isan" elementFormDefault="qualified"
       xmlns:xs="http://www.w3.org/2001/XMLSchema">
  <xs:import schemaLocation="http://www.coral-interop.org/arch/core/4-0/CoralCore4-
       0.xsd" namespace="http://www.coral-interop.org/arch/core/4-0" />
  <xs:import schemaLocation="http://www.isan.org/ISAN/isan.xsd"
       namespace="http://www.isan.org/ISAN/isan" />
  <xs:attributeGroup name="time attribute">
    <xs:attribute name="time" type="xs:duration" use="required" />
  </xs:attributeGroup>
  <xs:attributeGroup name="percent attribute">
    <xs:attribute name="percent" type="percent" use="required" />
  </xs:attributeGroup>
  <xs:attributeGroup name="priority attribute">
    <xs:attribute name="priority">
      <xs:simpleType>
        <xs:restriction base="xs:integer">
          <xs:maxInclusive value="100" />
          <xs:minInclusive value="1" />
        </xs:restriction>
      </xs:simpleType>
    </xs:attribute>
  </xs:attributeGroup>
  <xs:attributeGroup name="versioning mandatory attribute">
    <xs:attribute name="version" use="required">
      <xs:simpleType>
        <xs:restriction base="xs:integer">
          <xs:minInclusive value="0" />
        </xs:restriction>
      </xs:simpleType>
    </xs:attribute>
    <xs:attribute name="revision" use="required">
      <xs:simpleType>
        <xs:restriction base="xs:integer">
          <xs:minInclusive value="0" />
        </xs:restriction>
      </xs:simpleType>
    </xs:attribute>
  </xs:attributeGroup>
  <xs:complexType name="time interval">
    <xs:attribute name="start" type="xs:dateTime" use="optional" />
    <xs:attribute name="end" type="xs:dateTime" use="optional" />
    <xs:attribute name="duration" type="xs:duration" use="optional" />
  </xs:complexType>
  <xs:simpleType name="time code">
    <xs:restriction base="xs:string">
      <xs:pattern value="[0-9][0-9]:[0-5][0-9]:[0-5][0-9]:[0-9][0-9]@[0-9][0-9]" />
    </xs:restriction>
  </xs:simpleType>
  <xs:complexType name="time code range">
    <xs:sequence>
      <xs:element name="SegmentStart" type="time code" />
      <xs:element name="SegmentEnd" type="time code" />
    </xs:sequence>
  </xs:complexType>
  <xs:complexType name="segment list">
    <xs:sequence>
      <xs:element minOccurs="1" maxOccurs="unbounded" name="TimeCodeRange"
       type="time code range" />
    </xs:sequence>
  </xs:complexType>
  <xs:complexType name="id type" mixed="true">
    <xs:choice>
```

FIG. 30A

```
        <xs:element minOccurs="0" ref="isan:ISAN" />
        <xs:element minOccurs="0" ref="cor:resource" />
    </xs:choice>
    <xs:attribute name="type" use="required">
        <xs:simpleType>
            <xs:restriction base="xs:string">
                <xs:enumeration value="UUID" />
                <xs:enumeration value="ISAN" />
                <xs:enumeration value="Coral" />
                <xs:enumeration value="URI" />
                <xs:enumeration value="GRid" />
                <xs:enumeration value="ISRC" />
                <xs:enumeration value="Other" />
            </xs:restriction>
        </xs:simpleType>
    </xs:attribute>
</xs:complexType>
<xs:complexType name="country list">
    <xs:sequence>
        <xs:element minOccurs="1" maxOccurs="unbounded" name="Country">
            <xs:simpleType>
                <xs:restriction base="xs:string">
                    <xs:length value="2" />
                    <xs:pattern value="[a-zA-Z][a-zA-Z]" />
                </xs:restriction>
            </xs:simpleType>
        </xs:element>
    </xs:sequence>
    <xs:attribute name="type" use="required">
        <xs:simpleType>
            <xs:restriction base="xs:string">
                <xs:enumeration value="include" />
                <xs:enumeration value="exclude" />
            </xs:restriction>
        </xs:simpleType>
    </xs:attribute>
</xs:complexType>
<xs:simpleType name="matched components">
    <xs:restriction base="xs:string">
        <xs:enumeration value="audio" />
        <xs:enumeration value="video" />
        <xs:enumeration value="both" />
        <xs:enumeration value="any" />
    </xs:restriction>
</xs:simpleType>
<xs:complexType name="action">
    <xs:all>
        <xs:element minOccurs="0" name="NotifyOriginator" />
        <xs:element minOccurs="0" name="Log">
            <xs:complexType>
                <xs:attribute name="assertOwnership" type="xs:boolean" use="optional" />
            </xs:complexType>
        </xs:element>
        <xs:element minOccurs="0" name="ReportToOwner">
            <xs:complexType>
                <xs:attribute name="assertOwnership" type="xs:boolean" use="optional" />
            </xs:complexType>
        </xs:element>
        <xs:element minOccurs="0" name="TakeDown">
            <xs:complexType>
                <xs:all>
                    <xs:element minOccurs="0" name="CountryList" type="country list" />
                </xs:all>
                <xs:attribute name="assertOwnership" type="xs:boolean" use="optional" />
            </xs:complexType>
```

FIG. 30B

```
        </xs:element>
        <xs:element minOccurs="0" name="LeaveUp">
          <xs:complexType>
            <xs:all>
              <xs:element minOccurs="0" name="LeaveUpDuration" type="time interval"
  />
              <xs:element minOccurs="0" name="ExpiryActions" type="action" />
              <xs:element minOccurs="0" name="CountryList" type="country list" />
            </xs:all>
            <xs:attribute name="assertOwnership" type="xs:boolean" use="optional" />
          </xs:complexType>
        </xs:element>
        <xs:element minOccurs="0" name="Quarantine">
          <xs:complexType>
            <xs:all>
              <xs:element minOccurs="0" name="CountryList" type="country list" />
            </xs:all>
            <xs:attribute name="assertOwnership" type="xs:boolean" use="optional" />
          </xs:complexType>
        </xs:element>
        <xs:element minOccurs="0" name="AlternateContent">
          <xs:complexType>
            <xs:all>
              <xs:element minOccurs="0" name="CountryList" type="country list" />
            </xs:all>
            <xs:attribute name="alternateInfo" type="xs:boolean" use="optional" />
            <xs:attribute name="alternateUrlAsLink" type="xs:boolean" use="optional"
  />
            <xs:attribute name="displaySiteContent" type="xs:boolean" use="optional"
  />
          </xs:complexType>
        </xs:element>
        <xs:element minOccurs="0" name="OwnerAdSupported">
          <xs:complexType>
            <xs:sequence>
              <xs:element name="URL" type="url" />
              <xs:element minOccurs="0" name="CountryList" type="country list" />
              <xs:element minOccurs="0" maxOccurs="unbounded" default="any"
   name="AllowedType" type="ad type" />
            </xs:sequence>
          </xs:complexType>
        </xs:element>
        <xs:element minOccurs="0" name="SiteAdSupported">
          <xs:complexType>
            <xs:sequence>
              <xs:element minOccurs="0" name="CountryList" type="country list" />
              <xs:element minOccurs="0" maxOccurs="unbounded" default="any"
   name="AllowedType" type="ad type" />
            </xs:sequence>
          </xs:complexType>
        </xs:element>
        <xs:element minOccurs="0" name="License">
          <xs:complexType>
            <xs:all>
              <xs:element name="URL" type="xs:anyURI" />
              <xs:element minOccurs="0" name="CountryList" type="country list" />
            </xs:all>
          </xs:complexType>
        </xs:element>
      </xs:all>
  </xs:complexType>
  <xs:complexType name="url">
    <xs:simpleContent>
      <xs:extension base="xs:anyURI">
        <xs:attribute name="static" type="xs:boolean" use="required" />
```

FIG. 30C

```
        </xs:extension>
      </xs:simpleContent>
    </xs:complexType>
    <xs:simpleType name="ad type">
      <xs:restriction base="xs:string">
        <xs:enumeration value="video-pre" />
        <xs:enumeration value="video-post" />
        <xs:enumeration value="video-overlay" />
        <xs:enumeration value="banner" />
        <xs:enumeration value="text" />
        <xs:enumeration value="any" />
      </xs:restriction>
    </xs:simpleType>
    <xs:simpleType name="percent">
      <xs:restriction base="xs:integer">
        <xs:minInclusive value="0" />
        <xs:maxInclusive value="100" />
      </xs:restriction>
    </xs:simpleType>
    <xs:simpleType name="watermark type">
      <xs:restriction base="xs:string">
        <xs:enumeration value="DCI-forensic" />
        <xs:enumeration value="AACS-theatrical" />
        <xs:enumeration value="AACS-consumer" />
      </xs:restriction>
    </xs:simpleType>
    <xs:complexType name="matched threshold">
      <xs:attribute name="percent">
        <xs:simpleType>
          <xs:restriction base="xs:integer">
            <xs:minInclusive value="1" />
            <xs:maxInclusive value="100" />
          </xs:restriction>
        </xs:simpleType>
      </xs:attribute>
    </xs:complexType>
    <xs:complexType name="group" mixed="true">
      <xs:choice>
        <xs:element minOccurs="0" ref="isan:ISAN" />
      </xs:choice>
      <xs:attribute name="type" use="required">
        <xs:simpleType>
          <xs:restriction base="xs:string">
            <xs:enumeration value="UUID" />
            <xs:enumeration value="ISAN" />
            <xs:enumeration value="URI" />
            <xs:enumeration value="Other" />
          </xs:restriction>
        </xs:simpleType>
      </xs:attribute>
      <xs:attribute name="name" type="xs:string" />
    </xs:complexType>
    <xs:complexType name="asset">
      <xs:sequence>
        <xs:element minOccurs="0" name="OriginalAssetName" type="xs:string" />
        <xs:element name="OriginalAssetID" type="id type" />
        <xs:element minOccurs="0" name="AlternateURL" type="xs:anyURI" />
        <xs:element minOccurs="0" name="AlternateInfo" type="xs:string" />
        <xs:element minOccurs="0" maxOccurs="unbounded" name="Group" type="group" />
      </xs:sequence>
    </xs:complexType>
    <xs:complexType name="asset list">
      <xs:sequence>
        <xs:element minOccurs="1" maxOccurs="unbounded" name="Asset" type="asset" />
      </xs:sequence>
```

FIG. 30D

```
      </xs:complexType>
      <xs:complexType name="owner">
        <xs:sequence>
          <xs:element name="Name" type="xs:string" />
          <xs:element name="OwnerDomain" type="xs:anyURI" />
          <xs:element minOccurs="1" maxOccurs="unbounded" name="Email" type="xs:string"
           />
          <xs:element minOccurs="0" maxOccurs="unbounded"
           name="EmailTakeDownNotifications" type="xs:string" />
          <xs:element minOccurs="0" maxOccurs="unbounded" name="EmailReportToOwner"
           type="xs:string" />
          <xs:element minOccurs="0" maxOccurs="unbounded" name="EmailQuarantine"
           type="xs:string" />
          <xs:element minOccurs="0" maxOccurs="unbounded" name="EmailLeaveUp"
           type="xs:string" />
          <xs:element minOccurs="0" maxOccurs="unbounded" name="EmailConflicts"
           type="xs:string" />
          <xs:element minOccurs="0" maxOccurs="unbounded" name="EmailLog"
           type="xs:string" />
          <xs:element name="Phone" type="xs:string" />
          <xs:element minOccurs="0" name="Geography" type="country list" />
          <xs:element minOccurs="0" name="Extra" type="xs:string" />
        </xs:sequence>
      </xs:complexType>
    </xs:schema>
```

FIG. 30E

```xml
<?xml version="1.0" encoding="utf-8" ?>
<!--Created with Liquid XML Studio (http://www.liquid-technologies.com)-->
<xs:schema xmlns="http://www.movielabs.com/cr/rules"
    elementFormDefault="qualified"
    targetNamespace="http://www.movielabs.com/cr/rules" version="1.0"
    xmlns:xs="http://www.w3.org/2001/XMLSchema">
  <xs:include schemaLocation="crGeneric.xsd" />
  <xs:complexType name="detection_criteria">
    <xs:all>
      <xs:element minOccurs="0" name="MatchThreshold" type="matched_threshold" />
      <xs:element minOccurs="0" name="MinLengthMatched">
        <xs:complexType>
          <xs:attributeGroup ref="time_attribute" />
        </xs:complexType>
      </xs:element>
      <xs:element minOccurs="0" name="MinAggregateLengthMatched">
        <xs:complexType>
          <xs:attributeGroup ref="time_attribute" />
        </xs:complexType>
      </xs:element>
      <xs:element minOccurs="0" name="MinPercentOfSiteAssetMatching">
        <xs:complexType>
          <xs:attributeGroup ref="percent_attribute" />
        </xs:complexType>
      </xs:element>
      <xs:element minOccurs="0" name="MinPercentOfSiteAssetAggregateMatching">
        <xs:complexType>
          <xs:attributeGroup ref="percent_attribute" />
        </xs:complexType>
      </xs:element>
      <xs:element minOccurs="0" name="MinPercentOfOriginalAssetMatched">
        <xs:complexType>
          <xs:attributeGroup ref="percent_attribute" />
        </xs:complexType>
      </xs:element>
      <xs:element minOccurs="0" name="WatermarkDetected">
        <xs:complexType>
          <xs:attribute name="type" type="watermark_type" use="required" />
        </xs:complexType>
      </xs:element>
      <xs:element minOccurs="0" name="SectionMatched">
        <xs:complexType>
          <xs:attribute name="start" type="xs:duration" use="required" />
          <xs:attribute name="length" type="xs:duration" use="required" />
          <xs:attribute name="percent" use="required">
            <xs:simpleType>
              <xs:restriction base="xs:integer">
                <xs:minInclusive value="1" />
                <xs:maxInclusive value="100" />
              </xs:restriction>
            </xs:simpleType>
          </xs:attribute>
        </xs:complexType>
      </xs:element>
    </xs:all>
  </xs:complexType>
  <xs:complexType name="rule">
    <xs:all>
      <xs:element minOccurs="0" name="RuleValidDuration" type="time_interval" />
```

FIG. 31A

```xml
      <xs:element minOccurs="0" maxOccurs="1" name="IncludeSegments"
          type="segment_list" />
      <xs:element minOccurs="0" maxOccurs="1" name="ExcludeSegments"
          type="segment_list" />
      <xs:element minOccurs="0" name="DetectionCriteria"
          type="detection_criteria" />
      <xs:element name="Actions" type="action" />
    </xs:all>
    <xs:attribute name="name" type="xs:string" />
    <xs:attribute default="any" name="matchedComponents"
      type="matched_components" />
    <xs:attribute name="alwaysProcess" type="xs:boolean" />
    <xs:attribute name="ignoreWhiteList" type="xs:boolean" />
    <xs:attribute name="generateACNS" type="xs:boolean" />
    <xs:attributeGroup ref="priority_attribute" />
  </xs:complexType>
  <xs:element name="RuleList">
    <xs:complexType>
      <xs:sequence>
        <xs:element minOccurs="0" name="RuleListName">
          <xs:complexType>
            <xs:simpleContent>
              <xs:extension base="xs:string">
                <xs:attribute name="version" use="optional">
                  <xs:simpleType>
                    <xs:restriction base="xs:integer">
                      <xs:minInclusive value="0" />
                    </xs:restriction>
                  </xs:simpleType>
                </xs:attribute>
                <xs:attribute name="revision" use="optional">
                  <xs:simpleType>
                    <xs:restriction base="xs:integer">
                      <xs:minInclusive value="0" />
                    </xs:restriction>
                  </xs:simpleType>
                </xs:attribute>
              </xs:extension>
            </xs:simpleContent>
          </xs:complexType>
        </xs:element>
        <xs:element minOccurs="0" name="RuleListCreationTime" type="xs:dateTime" />
        <xs:element minOccurs="0" name="RuleListID" type="xs:string" />
        <xs:element minOccurs="0" name="RuleListValidDuration"
            type="time_interval" />
        <xs:element minOccurs="0" name="SiteConcerned" type="xs:anyURI" />
        <xs:element name="Owner" type="owner" />
        <xs:element minOccurs="0" maxOccurs="1" name="AssetList"
            type="asset_list" />
        <xs:element minOccurs="0" maxOccurs="unbounded" name="Rule" type="rule" />
      </xs:sequence>
      <xs:attributeGroup ref="versioning_mandatory_attribute" />
      <xs:attribute name="templateID" type="xs:string" />
    </xs:complexType>
  </xs:element>
  <xs:element name="AssetsWithTemplate">
    <xs:complexType>
      <xs:sequence>
        <xs:element minOccurs="0" name="AssetListID" type="xs:string" />
```

FIG. 31B

```xml
        <xs:element minOccurs="1" name="TemplateID" type="xs:string" />
        <xs:element minOccurs="0" name="SiteConcerned" type="xs:anyURI" />
        <xs:element name="Owner" type="owner" />
        <xs:element name="AssetList" type="asset_list" />
      </xs:sequence>
      <xs:attributeGroup ref="versioning_mandatory_attribute" />
    </xs:complexType>
  </xs:element>
</xs:schema>
```

FIG. 31C

```xml
<?xml version="1.0" encoding="utf-8" ?>
<!--Created with Liquid XML Studio (http://www.liquid-technologies.com)-->
<xs:schema xmlns="http://www.movielabs.com/cr/notification"
elementFormDefault="qualified"
targetNamespace="http://www.movielabs.com/cr/notification" version="1.0"
xmlns:xs="http://www.w3.org/2001/XMLSchema">
  <xs:include schemaLocation="crGeneric.xsd" />
  <xs:complexType name="site_asset">
    <xs:all>
      <xs:element name="SiteAssetID" type="xs:string" />
      <xs:element name="SiteDomain" type="xs:anyURI" />
      <xs:element minOccurs="0" name="TimeCreated" type="xs:dateTime" />
      <xs:element minOccurs="0" name="TimeMatchRequested" type="xs:dateTime" />
      <xs:element name="TimeMatchDetected" type="xs:dateTime" />
      <xs:element name="Format">
        <xs:complexType>
          <xs:simpleContent>
            <xs:extension base="xs:string">
              <xs:attribute name="type" use="required">
                <xs:simpleType>
                  <xs:restriction base="xs:string">
                    <xs:enumeration value="FileExtension" />
                    <xs:enumeration value="MIME" />
                  </xs:restriction>
                </xs:simpleType>
              </xs:attribute>
            </xs:extension>
          </xs:simpleContent>
        </xs:complexType>
      </xs:element>
      <xs:element name="Length" type="xs:duration" />
      <xs:element name="LengthDetected" type="xs:duration" />
    </xs:all>
  </xs:complexType>
  <xs:element name="Notification">
    <xs:complexType>
      <xs:all>
        <xs:element minOccurs="0" name="RuleListName">
          <xs:complexType>
            <xs:simpleContent>
              <xs:extension base="xs:string">
                <xs:attribute name="version">
                  <xs:simpleType>
                    <xs:restriction base="xs:integer">
                      <xs:minInclusive value="0" />
                    </xs:restriction>
                  </xs:simpleType>
                </xs:attribute>
                <xs:attribute name="revison">
                  <xs:simpleType>
                    <xs:restriction base="xs:integer">
                      <xs:minInclusive value="0" />
                    </xs:restriction>
                  </xs:simpleType>
                </xs:attribute>
              </xs:extension>
            </xs:simpleContent>
          </xs:complexType>
        </xs:element>
```

FIG. 32A

```
<xs:element minOccurs="0" name="RuleListCreationTime" type="xs:dateTime" />
<xs:element minOccurs="0" name="RuleListID" type="xs:string" />
<xs:element minOccurs="0" name="TemplateID" type="xs:string" />
<xs:element name="Owner" type="owner" />
<xs:element minOccurs="0" name="SiteConcerned" type="xs:anyURI" />
<xs:element name="Asset" type="asset" />
<xs:element minOccurs="0" name="RuleName">
  <xs:complexType>
    <xs:simpleContent>
      <xs:extension base="xs:string">
        <xs:attributeGroup ref="priority_attribute" />
      </xs:extension>
    </xs:simpleContent>
  </xs:complexType>
</xs:element>
<xs:element minOccurs="0" name="RuleListValidDuration"
    type="time_interval" />
<xs:element minOccurs="0" name="RuleValidDuration" type="time_interval" />
<xs:element minOccurs="0" maxOccurs="1" name="IncludeSegments"
    type="segment_list" />
<xs:element minOccurs="0" maxOccurs="1" name="ExcludeSegments"
    type="segment_list" />
<xs:element name="SiteAsset" type="site_asset" />
<xs:element name="MatchedComponents" type="matched_components" />
<xs:element name="OriginatorID">
  <xs:complexType>
    <xs:simpleContent>
      <xs:extension base="xs:string">
        <xs:attribute name="country">
          <xs:simpleType>
            <xs:restriction base="xs:string">
              <xs:length value="2" />
              <xs:pattern value="[a-zA-Z][a-zA-Z]" />
            </xs:restriction>
          </xs:simpleType>
        </xs:attribute>
      </xs:extension>
    </xs:simpleContent>
  </xs:complexType>
</xs:element>
<xs:element name="Actions" type="action" />
<xs:element minOccurs="0" name="MatchThreshold">
  <xs:complexType>
    <xs:attribute name="required" use="required">
      <xs:simpleType>
        <xs:restriction base="xs:integer">
          <xs:minInclusive value="1" />
          <xs:maxInclusive value="100" />
        </xs:restriction>
      </xs:simpleType>
    </xs:attribute>
    <xs:attribute name="observed" use="required">
      <xs:simpleType>
        <xs:restriction base="xs:integer">
          <xs:minInclusive value="1" />
          <xs:maxInclusive value="100" />
        </xs:restriction>
      </xs:simpleType>
    </xs:attribute>
```

FIG. 32B

```
      </xs:complexType>
    </xs:element>
    <xs:element minOccurs="0" name="LengthMatched">
      <xs:complexType>
        <xs:attribute name="required" type="xs:duration" use="required" />
        <xs:attribute name="matched" type="xs:duration" use="required" />
      </xs:complexType>
    </xs:element>
    <xs:element minOccurs="0" name="AggregateLengthMatched">
      <xs:complexType>
        <xs:attribute name="required" type="xs:duration" use="required" />
        <xs:attribute name="totalMatched" type="xs:duration" use="required" />
        <xs:attribute name="matchedFromThisOriginal" type="xs:duration"
          use="required" />
      </xs:complexType>
    </xs:element>
    <xs:element minOccurs="0" name="PercentOfLocalMatched">
      <xs:complexType>
        <xs:attribute name="required" type="percent" />
        <xs:attribute name="matched" type="percent" use="required" />
      </xs:complexType>
    </xs:element>
    <xs:element minOccurs="0" name="PercentOfOriginalMatched">
      <xs:complexType>
        <xs:attribute name="required" type="percent" use="required" />
        <xs:attribute name="matched" type="percent" use="required" />
      </xs:complexType>
    </xs:element>
    <xs:element minOccurs="0" name="AggregatedPercentLocalMatched">
      <xs:complexType>
        <xs:attribute name="required" type="percent" use="required" />
        <xs:attribute name="totalMatched" type="xs:duration" use="required" />
        <xs:attribute name="percentFromThisOriginal" type="percent"
            use="required" />
        <xs:attribute name="timeFromThisOriginal" type="xs:duration"
            use="required" />
      </xs:complexType>
    </xs:element>
    <xs:element minOccurs="0" name="SectionMatched">
      <xs:complexType>
        <xs:attribute name="start" type="xs:duration" use="required" />
        <xs:attribute name="length" type="xs:duration" use="required" />
        <xs:attribute name="percentRequired" use="required">
          <xs:simpleType>
            <xs:restriction base="xs:integer">
              <xs:minInclusive value="1" />
              <xs:maxInclusive value="100" />
            </xs:restriction>
          </xs:simpleType>
        </xs:attribute>
        <xs:attribute name="percentMatched" use="required">
          <xs:simpleType>
            <xs:restriction base="xs:integer">
              <xs:minInclusive value="1" />
              <xs:maxInclusive value="100" />
            </xs:restriction>
          </xs:simpleType>
        </xs:attribute>
      </xs:complexType>
```

FIG. 32C

```
        </xs:element>
        <xs:element minOccurs="0" name="WatermarkDetected">
          <xs:complexType>
            <xs:simpleContent>
              <xs:extension base="xs:string">
                <xs:attribute name="type" type="watermark_type" use="required" />
              </xs:extension>
            </xs:simpleContent>
          </xs:complexType>
        </xs:element>
      </xs:all>
      <xs:attributeGroup ref="versioning_mandatory_attribute" />
      <xs:attribute name="ignoreWhiteList" type="xs:boolean" />
      <xs:attribute name="generateACNS" type="xs:boolean" />
    </xs:complexType>
  </xs:element>
</xs:schema>
```

FIG. 32D

PROCESSING AND ACTING ON RULES FOR CONTENT RECOGNITION SYSTEMS

RELATED APPLICATION

The present invention claims priority of, and is a conversion of U.S. Provisional Patent Application No. 61/085,415 filed 31 Jul. 2008 to inventors Drewry, et al. The contents of such Application No. 61/085,415 are incorporated herein by reference.

FIELD OF THE INVENTION

The present disclosure relates generally to processing of digital signals representing content, and more specifically to recognizing content and acting upon the recognition.

BACKGROUND

A Note of Terminology and on URIs and URLs

A description of terms is provided herein in the DESCRIPTION OF EXAMPLE EMBODIMENTS section.

Uniform Resource Identifiers (URIs) and Uniform Resource Locators (URLs) are written herein without periods, but rather "*dot*" is used to denote a period in the actual URI or URL.

BACKGROUND TO THE INVENTION

User generated content (UGC) such as video and/or audio content is prevalent in public networks such as the Internet and readily available via the Web. Websites for viewing such user generated content are extremely popular. A good example of a UGC Website is www*dot*YouTube*dot*com. Some of such user generated content contains copyrighted material or portions thereof. Rights holders wish to protect or exploit such material in a flexible manner, e.g., with flexible rules for content recognition that depend on time and/or geography, and/or how much copyrighted material there is in the content, and that provide for a variety of actions, including allowing legally permitted use of content, e.g., viewing of short clips, removal of unauthorized content, or advertising associated with the content.

Note that "content" refers herein to digital data such as one or more of audio data, image data, motion picture (video) data, game data, and software data. The list is not exhaustive. For example, content might include olfactory content, and/or tactile content used in conjunction with audio and video content for playback of "rich" content that includes audio, video, tactile, and smell. The term "asset" is used herein to mean an item of content.

BRIEF DESCRIPTION OF THE DRAWINGS

FIG. 4A shows in flowchart form some of the process steps carried out as a result of a consumer submitting content, in accordance to an embodiment of the present invention.

FIG. 4B shows in flowchart form some of the process steps carried out as a result of a consumer submitting content, in accordance to an embodiment of the present invention.

FIG. 5 describes in table form a RulesList element according to some embodiments of the present invention.

FIG. 6 describes in table form an Asset element according to some embodiments of the present invention.

FIG. 7 describes in table form some different asset identifiers (IDs) according to some embodiments of the invention.

FIG. 8 shows in table form an example of an Owner element according to some embodiments of the invention.

FIG. 9 shown in table form a TimeInterval element for describing duration according to some embodiments of the invention.

FIG. 10 shows a TimecodeRange element according to some embodiments of the invention.

FIG. 11 shows a Group element used in some embodiments of the invention.

FIGS. 12A and 12B describe in table form a Rule element and its sub-elements according to an embodiment of the present invention.

FIGS. 13A and 13B describe in table form a DetectionCriteria element according to some embodiments of the present invention.

FIG. 14 shows in simplified table form an Actions element according to some embodiments of the invention.

FIG. 15 describes in table form the CountryList element according to an embodiment of the invention.

FIG. 16 describes in table form some relatively simple actions according to some embodiments of the invention.

FIG. 17 describes in table form a TakeDown element according to some embodiments of the invention.

FIG. 18 describes in table form a LeaveUp action element in accordance with some embodiments of the invention.

FIG. 19 describes in table form the Quarantine action element in accordance with some embodiments of the invention.

FIG. 20 describes in table form the AlternateContent action element for providing additional or alternate content or information, according to some embodiment of the invention.

FIG. 21 describes in table form the OwnerAdSupportedaction element in accordance with some embodiments of the invention.

FIG. 22 describes in table form the SiteAdSupported element in accordance with some embodiments of the invention.

FIG. 23 describes in table form the License element to indicate licensing as an action, in accordance with some embodiments of the invention.

FIGS. 24A-24C describe in table form a Notification element in accordance with some embodiments of the invention.

FIG. 25 describes in table form the WatermarkDetected element in accordance with some embodiments of the invention.

FIG. 26 describes in table form the SiteAsset element in accordance with some embodiments of the invention.

FIG. 27 shows in table form the modification of a RuleList element to include templates in some embodiments of the invention.

FIG. 28 describes in table form an AssetsWithTemplate element that is provided in some embodiments.

FIG. 29 shows in table form the modification of a Notification element to include templates in some embodiments of the invention.

FIGS. 30A-30E show one embodiment of crGeneric.xsd, the schema for shared generic types.

FIGS. 31A-31C show one embodiment of rules.xsd, the schema for RuleList XML document. See the "Rules, Criteria, and Actions" section.

FIGS. 32A-32D show one embodiment of notification.xsd: the schema for the Notification XML document. See the "Notifying External Systems" Section.

DESCRIPTION OF EXAMPLE EMBODIMENTS

Overview

Figure 1:
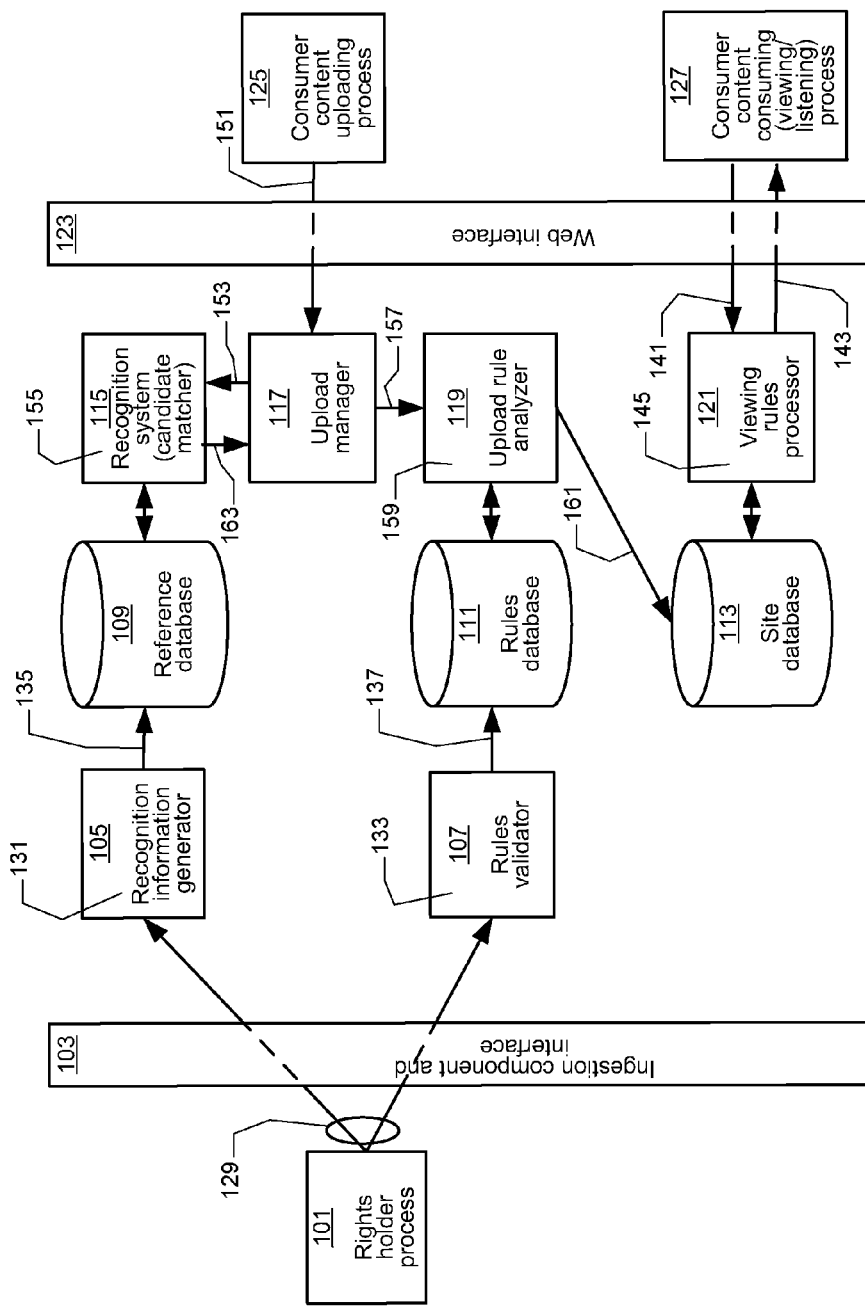
FIG. 1 shows a data-flow diagram of one embodiment of a system of processing elements and storage elements and a method of operating such a system.

Embodiments of the present invention include a method, and apparatus, and instructions encoded in one or more computer-readable tangible media that when executed carry out a set method.

Particular embodiments include a method of operating a processing system, including storing a set of rules for reference assets of content in computer-interpretable form. The rules allow the expression of a range of possibilities for determination of recognition of items of content and a wide range of actions to take when such determination is made.

Particular embodiments include a method of operating a processing system to recognize content and possibly act on the recognition results, the recognition and acting according to a stored set of rules expressed in computer-interpretable form that allow the expression of a range of possibilities for determination of recognition and a wide range of actions to take when such determination is made.

Particular embodiments include a computer readable storage medium encoded with a set of rules stored in a computer-interpretable form. The rules allow the expression of a range of possibilities for determination of recognition and a wide range of actions to take when such determination is made.

According to different embodiments, the rules include geographical information, such that a process operating on a processing system using the rules can carry out recognition and/or actions that explicitly include, are limited to, or explicitly exclude geographic regions such as particular countries or sets of countries, a process we call geographical windowing.

According to different embodiments, the rules include temporal information, such that a process operating on a processing system using the rules can carry out recognition and/or actions that explicitly include, are limited to, or explicitly exclude periods of time, a process we call temporal windowing.

According to different embodiments, the rules include both geographical information and temporal information to enable a combination of temporal windowing and geographical windowing.

Particular embodiments include a system for and a method of operating a processing system to define the rules to associate one rule or a plurality of different rules with the one asset.

Particular embodiments include a system for and a method of operating a processing system to define the rules to associate one or more sets of at least one asset with a rule or a set of rules.

Particular embodiments include a system for receiving, storing, processing, and acting upon rules stored within the system responsive to content being submitted, e.g., being submitted for uploading to a UGC site or for uploading to an asset sharing site.

In the rules, according to different embodiments, an asset can have one rule or a plurality of rules associated with it. Furthermore, a single set of rules can be associated with one or with a plurality of assets. Furthermore, the same asset can have different rules associated with it depending on the recipient site where the candidate item of content resides on which a method of asset identifying is being carried out. By a recipient site is meant a particular site or an internet service provider (ISP), e.g., a site to which a candidate item of content is uploaded. For example, the same asset would have different rules applicable to different entities, e.g., different UGC sites depending on the different commercial arrangements between the recipient entity, e.g., the UGC site, and the rights holder(s) of the asset.

Particular embodiments include a method of operating a processing system that includes one or more processors and a storage subsystem. The method comprising one or more of the set of processes consisting of a first process of ascertaining whether a candidate item of content at a particular recipient site is matched to one or more of a set of reference assets of content and a second process including accepting one or more rules for one or more reference assets and storing the one or more rules in the storage subsystem in computer-interpretable form. The first process comprises accepting a candidate item of content or recognition information thereof, comparing the accepted candidate item of content or the recognition information thereof with a set of reference assets of content using a set of rules stored in the storage subsystem in computer-interpretable form, and in the case that there is a match, using a stored rule to ascertain what action or actions to take for the match. The rules including for each reference asset of content one or more content match criteria for matching the candidate item of content at a particular recipient site with said each reference asset of content. The rules further include action rules for defining one or more actions to take in the case that there is a match with a reference asset of content. For a reference item of content that includes audio and video components, separate rules can be provided for matching just the audio component and for matching just the video component.

In some versions, the storing of the one or more rules is in a rules data structure. In some versions, the second process further includes accepting the one or more reference assets or asset recognition information for the one or more reference assets; and storing the one or more reference assets or asset recognition information in a reference asset data structure in the storage subsystem.

Particular embodiments include a processing system comprising one or more processors and a storage subsystem. The storage subsystem is configured with one or more computer-interpretable rules for one or more reference assets of content. The one or more rules define for a particular reference asset of content one more match criteria to determine whether there is a match of a candidate item of content at a particular recipient site with the particular reference asset of content, and also define one or more actions to take for any match. For a reference item of content that includes audio and video components, separate rules can be provided for matching just the audio component and for matching just the video component. The storage subsystem is configured with instructions that when executed cause the processing system to carry out one or more of the set of processes consisting of a first process of receiving and storing an additional one or more reference assets of content or asset recognition information for the additional one or more reference assets, and an additional set of one or more rules for the additional one or more reference assets, a second process of receiving and storing an additional set of one or more rules for one or more reference assets of content for which at least one rule already is stored, and a third process of accepting a candidate item of content and processing one or more of the rules responsive to the candidate item of content being accepted, wherein the processing includes activating a content recognition method according to the match criteria, and activating an action in the case the content recognition method indicates one or more matches.

Particular embodiments include a computer-readable storage medium configured with instructions that when executed by one or more processors of a processing system that includes one or more processors and a storage subsystem, cause carrying out of a method comprising one or more of the set of processes consisting of a first process of ascertaining whether a candidate item of content at a particular recipient site is matched to one or more of a set of reference assets of content and a second process including accepting one or more rules for one or more reference assets and storing the one or more rules in the storage subsystem in computer-interpretable form. The first process comprises accepting a candidate item of content or recognition information thereof, comparing the accepted candidate item of content or the recognition information thereof with a set of reference assets of content using a set of rules stored in the storage subsystem in computer-interpretable form, and in the case that there is a match, using a stored rule to ascertain what action or actions to take for the match. The rules including for each reference asset of content one or more content match criteria for matching the candidate item of content at a particular recipient site with said each reference asset of content. The rules further include action rules for defining one or more actions to take in the case that there is a match with a reference asset of content. For a reference item of content that includes audio and video components, separate rules can be provided for matching just the audio component and for matching just the video component.

In some versions, the storing of the one or more rules is in a rules data structure. In some versions, the second process further includes accepting the one or more reference assets or asset recognition information for the one or more reference assets; and storing the one or more reference assets or asset recognition information in a reference asset data structure in the storage subsystem.

In some versions, the rules substantially conform to "The Principles for User Generated Content Services" published Jul. 30, 2008 at http://www*dot*ugcprinciples*dot*com, where *dot* refers to the period (".") character.

The separation of audio and video matching covers objections made to current systems by the Electronic Frontier Foundation (EFF), of San Francisco, Calif., whose online Website is www*dot*eff*dot*org, where *dot* denoted a period in the actual URL. Having a set of rules described by a grammar is known and covered, e.g., by MPEG21 XrML. However, such known grammars and rules do not allow for separate rules for the audio and the video component of an item of content.

Embodiments of the invention include one or more of the following features:

The ability to apply a set of rules directly to one or more individual assets or to a set of assets indirectly defined by a template. The rules described herein are able to support both instances of rules and templates of rules for groups of assets.

Support for fully local or fully distributed systems. This enables some rights holder(s) to keep a central repository for rules or reference asset identification information, e.g., for reasons or ease of control, and possibly other reason(s). This also enables some rights holder(s) to outsource the repository for rules or reference asset identification information to a UGC site, e.g., for operational reasons.

Prioritization of actions to take, depending on the amount of content matched.

Aggregate content match criteria that provides for triggering actions in an aggregate content match criterion. As an illustrative example, if three sketches from three episodes of "The Muppet Show" are detected and their total time exceeds the time in an aggregated match rule, three actions, e.g., three notifications might be generated.

Computer interpretable rules. The rules are expressible in a computer-interpretable formal language having a computer interpretable syntax. One embodiment uses XML (Extensible Markup Language). One alternate embodiment uses OWL (Web Ontology Language). Another uses RDF (Resource Description Framework). Having computer-interpretable rules allows for automated generation of the rules, for machine verification of the rule syntax, and for computer-implemented conflict checking.

Support for release windowing by geography, e.g., country.

Support for release windowing by time. The one or more actions for a match can depend on when the match occurs relative to a date specified for the reference asset of content, e.g. relative to a release date, or as another example, relative to the date when rights transfer from one entity to another.

Support for release windowing by time and geography.

Support for release windowing by time and by amount of content. For example, the actions might change over time relative to some specified date, e.g., to the release date for the original asset of content, or the date when rights transfer from one entity to another, and, including according to how much content is recognized.

Support for release windowing by geography and by amount of content. For example, the actions might differ for different release jurisdictions according to how much content is recognized.

A mechanism or scheme for content rights holders or parties authorised to provide rules for the content to express how to display and how to promote their content posted by anonymous Users.

Support for specifying actions. Simple actions include logging, notifying the originator, reporting to the asset owner. More complex actions include taking down content, leaving content up, guaranteeing content, offering a license, and/or playing back alternate content. Such actions may have one or more options specified, such as asserting ownership, with optional geographical specification of where the action is and/or is not to take place. Several notification alternatives also are provided, as are advertising supported actions.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Current Content Recognition and Recognition Action Methods

Rights management systems include a system implementing a method or methods for recognizing content based on analysis of the content using technologies such as fingerprinting and watermarking Once content is recognized by a content recognizing method, in response, a rights management system might carry out an action, e.g., instructing the site hosting the content to leave it, or remove it, or other simple actions. However, known recognition systems and the simple set of actions provided by current rights management systems do not meet the needs of most rights holders in flexibility and options, nor allow for the protection of legally allowed use of content.

In more detail, fingerprinting, also called content-based identification, refers to determining a compact representation of content that preserves distinguishing characteristics that may be used to identify the content. Watermarking refers to embedding identifying information into content, thus altering the content. The information is not a function of the content. The watermark information is embedded in a manner so that it is imperceptible to human senses in the normal course of using of the content, e.g., invisible in the case of video, and inaudible in the case of audio. The watermark has, however, one or more distinguishing characteristics that may be used to identify the existence of the watermark, and in the case the watermark identifies one or more characteristics of the content, such characteristic(s).

For a survey of image and video fingerprinting, see N. Nikolaidis and I. Pitas, "Image and video fingerprinting for digital rights management of multimedia data." IEEE 2006 International Symposium on Intelligent Signal Processing and Communication Systems, (ISPACS2006), Tottri, Japan, 2006. For a survey of audio fingerprinting, see Cano, P., Batlle, E., Kalker, T. and Haitsma, J.: "A review of algorithms for audio fingerprinting," Proceedings of International Workshop on Multimedia Signal Processing, US Virgin Islands, December 2002. For a survey of watermarking, see E. Muharemagic and B. Furht, "A Survey of Multimedia Watermarking Techniques," chapter 7, in B. Furht and D. Kirovski, "Multimedia Security Handbook," CRC Press, 2005.

Automatically carrying out an action in response to recognition is known. For example, a methodology known as Automated Copyright Notice System (ACNS) is known. ACNS is a Digital Millennium Copyright Act (DMCA) compliant way of communicating a single action by the removal of the offending content. ACNS assumes there is a binary (yes/no) matching decision, that is, that there is certainty that a match for a copyrighted asset was found. A description of ACNS can be found at http://mpto*dot*unistudios*dot*com/xml/ (retrieved May 6, 2008) and the associated summary document http://mpto*dot*unistudios*dot*com/xml/ACNS_Summary*dot*doc (retrieved May 6, 2008).

Some existing (mid-2008) fingerprinting systems allow for tuning of what constitutes as "recognition." However, such specification of what constitutes tuning is per instance of such a system, not specifying what constitutes recognition for each asset. Examples of such fingerprinting systems are those by Philips Content Identification of Eindhoven, the Netherlands, and the NexGuard® system from Thomson of France. Another product, SysCoP® is incorporated into the Thomson product, and based on a system originally marketed by MediaSec in Germany. Some fingerprinting systems are known to provide some additional details regarding how content is matched. One such example is the CopySense® system, available as a network appliance, and Website monitoring service by Audible Magic Corporation, of Los Gatos, Calif. However, the set of actions to take upon a match are limited. Note also that the Audible Magic system carries out fingerprinting of audio content, e.g., the audio component of video content that includes audio and video. Furthermore, present-day ((mid-2008) systems do not permit separate rules for the audio and video of a single audiovisual content item.

Finally, currently (mid-2008), known systems generally mandate a particular or specific network and database topology. This results in inflexibility when integrating with a pre-existing application or workflow.

Therefore, there is a need for improved processing and acting on rules for content recognition systems.

DESCRIPTION OF TERMS

ACNS—Automated Copyright Notice System, a format for communicating a notice of potential copyright infringement to rights holders and originators. An XLM version is available at http://mpto*dot*unistudios*dot*com/xml/ (retrieved 8 Jul. 2008).

Asset—(also "asset of content") An item of content such as an item of one or more of audio data, image data, motion picture (video) data, game data, software data, olfactory data, and/or tactile data, and so forth. See "site asset" and "original asset".

Candidate asset—A site asset that is being checked by an identification or recognition method for similarity to any reference asset of a set of reference assets. A candidate asset is also referred to as a candidate item of content.

DCI—Digital Cinema Initiative, an industry standard for distribution and protection of digital theatrical content, including specifications for an open architecture to support digital cinema, including forensic marks. See http://www*dot*dcimovies*dot*com (8 Jul. 2008).

Fingerprint—Information, e.g., as a set of bits generated from an asset such that a fingerprint generated from an unknown asset can be used to associate the unknown asset with one or more original assets by comparing the fingerprint from the unknown asset to a reference database of fingerprints from original assets, e.g., via a search of the database.

Group—A set of original assets that are related somehow; for example, all the episodes of a series might form a group.

Identifier—A sequence of bits, usually represented as a number or string, used as reliable shorthand in a particular context for referencing a set of information. Examples include database keys, products' SKUs (Stock-Keeping Units), and email addresses. Other examples for a product include Universal Product Code (UPC), European Article Number (EAN), Global Trade Item Number (GTIN) and Australian Product Number (APN).

ISAN—(International Standard Audiovisual Number), an international standard for assigning unique identifiers to an audiovisual work. Within ISAN, international standard ISO 15706-1 covers basic works and registration, while international standard ISO 15706-2, also known as "v-ISAN," deals with multiple versions of the same work. These standards can be found at http://www*dot*iso*dot*org.

Master asset—See Original asset.

Original asset—An asset of content that has been entered into the reference database. An original asset is also called a reference asset. This is an asset against which uploaded content (a candidate asset) will be searched or compared by an identification or recognition method for similarity, and to which one or more rules apply in case there is a match.

Originator—The source of a site asset; e.g., the person or entity or location, such as an IP address that provided a particular site asset.

Owner—An entity with the authority to provide a set of rules (see RuleList) for an original asset. The term "owner" is used by the processes to be broader than the strict legal meaning of owner of an original asset. It is up to the entity ingesting the rules to determine whether or not the sender of the rules is allowed to submit them for a particular piece of content as part of verification and conflict checking. In one embodiment, if there is a conflict, a separate manual process is used to resolve the conflict. Often, but not necessarily, the "owner" will be a copyright holder, i.e., the legal owner. Sometimes, it is the distributor for the asset, hence not legally the actual owner. The "owner" as used herein can also be some other authorized third party. For example a law enforcement agency may request that terrorist or pornographic videos be entered in the reference database along with associated rules.

Recipient—a receiving site or receiving internet service provider (ISP) for which the rules apply. Although this document uses phrases such as "the rules for an asset," that in no way implies a single set of rules for each asset, and should be read as "rules for an asset for a particular site or ISP." The separation of rules into a separate file for each recipient also makes it easier to keep per-recipient information, e.g., Agreements between a site such as a UGC site and an owner confidential. Note that in the RuleList, the recipient is denoted as an element called SiteConcerned.

Reference asset—Same as original asset: an asset that has been entered into the reference database. This is an asset against which uploaded content will be compared (searched for).

Reference database—Information about a set of original assets. See the "Description of a System" section below for more details of how the reference database is constructed and used in some embodiments.

Rule Instance—A rule that is directly associated with an asset; it is the asset's own copy of the rule, and can be changed only by replacing it. When a rule instance changes, only the asset to which it is attached is affected.

Rule Template—A rule that is associated with an asset by reference. When the rule template is changed, all assets that refer to it use the new rule. The connection between asset and template can be broken by making the asset refer to a different template or by replacing the template with an instance.

RuleList—The definition of the rules for processing and actions as described herein in embodiments of the invention, such a definition in embodiments including an identifier of the RuleList, information on the RuleList owner (see definition of "owner") and/or the rights holder of the assets the rules apply to, the one or more assets the rules apply to, the recipient, and the rules themselves.

RuleSet—The definition of the rules of a RuleList that describes the processing and actions according to embodiments of the invention.

Site—The external manifestation of a collection of hardware, software, and assets, such as a User Generated Content (UGC) Website or a file-sharing Website or a peer that sources UGC or other assets. A site has an IP address, and may have one or more have associated domain names.

Site asset—An asset at a particular site, for example, an uploaded video at a UGC site.

SiteConcerned—The site for which a RulList applies. See Recipient.

UGC—User Generated Content, conventionally referring to uploaded audio and/or video assets.

URI—Uniform Resource Identifier.

URL—Uniform Resource Locator; in this disclosure it is used as shorthand for a URI with http as the URI scheme.

UUID—Universally Unique Identifier. The term "universally unique" in this expression means "highly probably unique." A survey of techniques and sources for generating reliably UUIDs at the Web archive www*dot*archive*dot*org of the site http://en*dot*wikipedia*dot*org/wiki/UUID dated 11 Nov. 2007, retrieved 11 Jul. 2009 at http://web*dot*archive*dot*org/web/20071111175318/http://en*dot*wikipedia*dot*org/wiki/UUID.

Watermark—An identifier that can be added to an asset for later extraction. Ideal watermarks in the context of content recognition methods generally are non-removable, imperceptible to human senses, and immune to standard audiovisual transformations.

Whitelist—A whitelist is a mechanism used to explicitly and efficiently allow a known party to do a particular thing, bypassing usual processes. For example, content submitted from the marketing department of a studio might be accepted onto a UGC site with no further checking or questioning. The opposite of a whitelist is a blacklist, which explicitly and efficiently disallows a known entity from doing something. Whitelists are used when the number of exceptional allowances is small, blacklists when the number of exceptional prohibited parties is small.

Description of Rules

In one embodiment, the rules for content recognition and actions are defined by what we call "RuleList" structures for each set of one or more rules (a "rule set"). An owner issuing rules may issue a different RuleList for different recipients for the same assets. One aspect of the invention is storing the RuleList structures for rule sets in a storage subsystem of a processing system, e.g., in a database—the rules database, which in some embodiments is stored together with the reference database of reference assets, and in another embodiments, is stored separate from the reference database. In one embodiment, a rule set (the RuleList structure) includes five parts as follows:

1) Information about the RuleList, such as a name, an ID (a rule set identifier), and a creation date.
2) Information about the RuleList owner ("rule set owner information"), e.g., the rights holder who is issuing the RuleList, including geographical areas that are explicitly included or excluded in RuleList owner's, e.g., the rights holder's jurisdiction.
3) Information about the recipient for which the rules apply ("SiteConcerned"). If not provided, the rules apply to all recipients.
4) A list of one or more reference assets of content to which the rules apply, i.e., with which the rule set is associated. A reference asset contains:
   A unique ID, expressed using one or more of a set of ID methods.
   Optional information, such as a name and additional information to display to a consumer in certain circumstances.
5) A set of rules (RuleSet). In one embodiment, each rule includes the following elements:
   A rule priority.
   A set of one or more associated content match criteria for matching content to an associated reference asset (See list below.).
   A set of one or more rule associated geographical region match criteria indicative of which geographical region or regions the rule applies. Such a geographical region match criterion might explicitly state region(s) to include, and/or region(s) not to include.

A set of one or more rule associated temporal match criteria indicative of one or more time windows within which the rule is valid and should be applied. Such a temporal match criterion might explicitly state time window(s) to include, and/or time window(s) not to include.

A set of one or more associated actions to take if there is a match according to the match criteria, including a content match criterion, a geographical region match criterion, and a temporal match criterion (See list below).

Note that some of these rule elements are optional. For example, when no recipient (SiteConcerned) is provided, the Rules apply to all recipients. As another example, when no geographical region is specified, the rule applies to all geographic regions. Furthermore, note that in some alternate embodiments, rules have fewer elements, e.g., no time window. Also, one skilled in the art would understand that more rule elements can be added, and such an embodiment having more rule elements is within the scope of the present invention.

In one embodiment, when a rule is triggered as a result of recognition, a notification is generated that includes:

Information about the RuleSet and the individual rule that got triggered.

Detailed information about the content match criteria.

A list of actions to take.

Thus, the systems and methods described herein, include a set of rules expressed in a computer-interpretable grammar that allow the expression of a range of possibilities for determination of recognition and a wide range of actions to take when such determination is made.

The Principles for User Generated Content Services.

A group of copyright owners and UGC sites have announced "The Principles for User Generated Content Services," hereafter "UGCPrinciples", retrieved Jul. 30, 2008 at http://www*dot*ugcprinciples*dot*com. The UGCPrinciples are included in this specification as an APPENDIX. The UGCPrinciples set out a consistent and coherent view of the legal, moral, and commercial rules of the road for this area. UGCPrinciples, however, leaves open two important questions:

What does it mean to match a piece of content, and how is actionable infringement of the rights of the copyright holder determined? The rules are typically different for different content owners and also the type of asset, e.g., movies vs. newscasts.

One of the UGC Principles states that a Copyright Owner needs to have "provided . . . instructions regarding how matches should be treated." This is only possible if there is a clear and unambiguous way of providing the instructions.

One feature of embodiments of the invention provides a framework that allows content owners a way to express the actions they want taken for a specific asset, while addressing the UGC Principles.

Another view of the subject is taken by the Electronic Frontier Foundation (EFF) in "Fair Use Principles for User Generated Video Content" (hereafter "EFF Fair Use" available (Jul. 17, 2008) at http://www*dot*eff*dot*org/issues/ip-and-free-speech/fair-use-principles-usergen. EFF Fair Use sets out a different set of rules but similarly to UGC Principles, it does not define any technology for communicating the information.

The principles described by UGC Principles and EFF Fair Use can both be built on top of a common technology framework using the rules described in one or more embodiments of the invention. Different implementations of the systems described herein can handle most if not all of the principles.

The description herein is sufficient for creation, distribution, and implementation of a set of precise rules covering:

One or more criteria that apply once a basic content match has been determined and that are evaluated before triggering any actions. These can be used to implement the actions that could occur during a use upload to a UCG site process, as well as many others.

The actions "remove," "allow", and "license" and "replace." These actions are called for, e.g., in the UGCPrinciples. Other common actions also can be covered by the rules.

A format for communicating the actions and the triggering criteria to processing systems that implement the actions when content is uploaded or accessed.

Description of an Example System

A way of communicating a required action from a processing system that evaluates the rules to other processing systems, which consists of notifications passed from the rules system to a set of external processing systems.

FIG. 1 shows a data-flow diagram of one embodiment of a system of processing elements and storage elements and a method of operating such a system.

Typically, the processing elements are implemented in one or more processing systems, each processing system including one or more processors and a storage subsystem that typically includes memory. The storage subsystem includes instructions that when executed cause carrying put of the method of the processing element(s). The storage elements are in one or more storage subsystems.

The system of FIG. 1 includes one or more particular processing elements that use rules as a way of defining detection criteria and consequences of detection in content recognition systems, e.g., systems that carry out content recognition using metadata, fingerprinting and/or watermarking FIG. 1 thus also describes method steps for carrying out the associated method(s).

The system carries out a method for communicating the desired behavior from the rights holder to another entity, e.g., a UGC site. The desired behavior is expressed by the rights holder in some embodiments as a set of rules. The method includes uploading an asset and the rules for the asset, e.g., by an asset rights holder or an agent of such a rights holder.

The system also can carry out a method of a user, e.g., a consumer uploading content to a site such as a UCG site. The system also can carry out a method of a consumer requesting and viewing or listening content from a site such as a UGC site. The verb "consume" content is used herein to mean access uploaded content for listening, viewing, or otherwise consuming.

The system of FIG. 1 includes one or more particular elements for processing and/or acting on rules for a content recognition method. FIG. 1 thus also describes method steps for processing and/or acting on rules for a content recognition method.

One embodiment of a method implemented by the flow diagram of FIG. 1 includes generating and storing on a storage subsystem of a processing system a reference database of reference assets and associated rules. In some embodiments, the reference database stores the reference assets and a separate rules database stores the associated rules. Such separate databases, and indeed each individual database can be in the same or distributed in different storage subsystems that are coupled to the same processing system and/or that are coupled to each other by a network. Furthermore, these databases may be distributed over several storage subsystems that are in or coupled to by a network to several processing systems that are coupled by a network. Therefore, in this description, the term "processing system" describes a local processing system that includes one or more processors and also includes or is coupled to a storage subsystem, e.g., including a memory and one or more other storage element. The term "processing system" also encompasses a distributed system that includes a plurality of local processing systems each including or coupled to a storage subsystem, the local processing systems coupled via a network, and the coupling of a local processing system to a coupled storage subsystem being either direct or via a network.

It would be clear to those skilled in the art that the contents of the database can change over time as rights holders add content—the reference asset—and associated rule(s). While one method described is for adding a reference asset and its associated rules to the database, it would be clear to those skilled in the art that such a method also is applicable to modifying rules for a reference asset, and also is applicable to removing a reference asset and/or rules for a reference asset from the reference database.

Changed rules and/or changed reference assets of content are stored in the database. Similarly, content is added and stored in the database. Further, any removal of content is noted and an indication of the removal is stored in the database.

The method implemented by the data flow diagram of FIG. 1 includes a recognition method that takes an item of content—termed a candidate asset—and evaluates it against the database according to one or more match criteria expressed in the rules associated with reference assets. In the case of one or more matches, the rules associated with the matched reference asset are invoked. Part of invoking the rules might include carrying out one or more actions associated with the rules. The method includes communicating a required action to an action system that carries out the action. Many such action systems and action methods are known, and how to include such an action system and/or the process steps of an action method would be clear to those skilled in the art. How to communicate one or more notifications of required action or actions from the rules system, e.g., that of FIG. 1 that evaluates the rules to one or more external systems that carry out actions would also be clear to those skilled in the art. Therefore, details of implementing the one or more actions that are the consequences of a match, or details of action system(s) that achieve such actions are not provided herein, or details of communicating notifications of required action(s) to one or more action systems are not required herein for practicing the different aspects of the invention.

In a step 129, a rights holder process 101, e.g., operating in a rights holder's processing system sends a reference asset and one or more rules therefor to an ingestion component 103 that in one embodiment provides an ingestion interface. In one embodiment, the ingestion component 103 is in the form of a processing system that when executing instructions on a tangible storage medium, carries out a ingestion method, including providing the ingestion interface. The rules describe one or more match criteria that refine the concept of "matching" and also a set of one or more actions to take if at least one of the one or more criteria is met. An action may be an action designed to take place when a consumer uploads or attempts to upload content and/or may be an action designed to take place when a consumer attempts to consume (view or listen to) uploaded content. Typically, the rule(s) are computer-interpretable expressed in code, e.g., in XML that is machine-generated on a computer, via a GUI or some other tool, rather than hand-built.

While a single rights holder process 101 is shown in FIG. 1, the reference asset and the rules therefor can be generated and ingested at different times and/or from different sources.

In one embodiment, the reference asset and rules therefor typically are identified by the one identifier, an asset identifier, denoted OriginalAssetID, to indicate that the asset rules apply to the one reference asset with the same identifier.

In a step 133, a rules validator 107 carries out validity checking on the rules. In some embodiments, such validity checking includes verification of syntax including rule structure, and further includes conflict checking to ascertain whether there is conflict with any already existing rule or rules already stored in the database of rules and available to the overall method. Part of conflict checking in some embodiment includes checking that the owner has permission to issue the rules. Conflict free and syntax verified rules are called validated rules.

In a step 137, the validated rules from the validation step 133 are stored in a rules database 111 that is maintained in a storage subsystem by a processing system that includes the storage subsystem, "that includes" also encompassing the case of the storage subsystem being coupled to the processing system via a network. In one embodiment in which the computer-interpretable rules are in XML (a computer interpretable form,) the rules are stored as the original XML. In other embodiments, the rules are processed or compiled into a different computer-interpretable form that is designed for the runtime environment, e.g., in a language more suited for the runtime environment than XML. Such implementation details and optimizations are left out of this description, and would be clear to those skilled in the art without further description.

With respect to the sent asset, step 131 includes a recognition information generator 105 generating reference asset recognition information for the reference asset. The content recognition information includes such information as one or more fingerprints, metadata, and/or one or more watermarks usable for matching. While FIG. 1 shows this step 131 being carried out after ingestion, in alternate embodiments, the recognition information generating can be performed earlier in the process, e.g., by or on behalf of the rights holder, in which case the step 129 includes sending the reference asset recognition information rather than the reference asset itself. Furthermore, in different embodiments, reference information for audio and video components of the same asset may be generated separately to provide for separate recognition of the audio and of the video of the same asset. The audio and video in such a case are different reference assets of the same base asset.

In a step 135, the reference asset recognition information for the reference asset is stored in a reference database 109.

While FIG. 1 shows separate databases 109 and 111 for the reference asset recognition information and for the rules, in many implementations, the rules database 111 and the reference database 109 are stored together, e.g., as part of the same overall database, while in other embodiments, the rules for the asset and the reference information are stored separately. Furthermore, in some embodiments for audiovisual content, the reference information for the audio component is stored separately from the reference information for the video component.

Consider now operation of the system when a consumer uploads content—what we call candidate content—using a consumer content uploading process 125 that for example is carried out in a consumer processing system such as a personal computer (PC) coupled to a network such as the Internet, e.g., by executing instructions in an included storage subsystem of the consumer processing system on one or more processors included in the consumer processing system.

Suppose in a step 151 the consumer content uploading process uploads content destined to a Website, e.g., a UCG site, via a Web interface 123. Suppose the various processing systems and databases 117, 115, 119, 121, 113, 111, and 109 are coupled via the Internet. One embodiment of the method and system includes, when someone tries to upload content, checking the content against asset information in the reference database 109 and taking action if the candidate content is recognized, wherein, in one embodiment, a degree of recognition is provided, rather than a simple yes/no result.

The step 151 includes candidate content—a candidate asset—being sent to a front-end upload manager 117, e.g., an upload management system in the form of a processing system including storage containing instructions that cause the processing system to carry out one or more processing steps.

In step 153, the upload manager 117 sends the candidate asset to a recognition system 115, also called a candidate matcher 115 herein. The recognition system 115 in step 155 checks the candidate against the reference database or databases (collectively 109), and in 163, returns information about any matches to the upload manager 117. In the case that there is any positive match information generated, the match information is in the form of a set of one or more reference assets identifiers and further match information, e.g., a degree of match for each matched reference asset.

In the case that there is any match information generated, e.g., information that there is an exact match, or less than an exact match, but still a form of a match, in a step 157, the upload manager 117 sends the match information on the candidate asset to an upload rule analyzer 119, e.g., a process operating on a rules processing system. In a step 159, the rules associated with the reference asset(s) that was/were matched by the recognition system 115 are fetched from the rules database 111 and evaluated for each matched reference asset.

Some embodiments of the present invention provide for rules of different priority being available in the rules database for any reference asset. In some embodiments, step 159 includes determines the highest priority rule or rules that the detailed criteria of which have been met as a result of the identification by the recognition system 115, such determining being from the rule lists for any matched reference assets.

When recognition occurs, one or more actions are caused to take place according to the rules associated with the reference asset. Each rule has one or more associated actions. For each rule, the associated actions are communicated to one or more action systems that perform or apply actions. It is possible that multiple rules will apply from multiple reference assets and that multiple actions will be triggered.

In a step 161, the upload rule analyzer sends or causes delivering allowable content and any use-time actions associated in accordance with the rules as a result of the matching. Such content and associated action-time actions (also called viewing rules, although applicable to all consuming of content, e.g., viewing and/or listening) are delivered to site database 113 for the UGC site. Other actions also are possible as a result of the recognition.

Thus, content is uploaded to the site database 113 together with viewing rules associated with the content.

Different viewing rules may exist as a function of the UGC site and the owner of the reference asset. For example, the owner may have an arrangement with the UGC site for consuming (viewing or listening to) the particular asset.

Consider now a consumer operating a consumer content consuming (viewing/listening) process 127, e.g., running a Web browser process on a personal computer for viewing or listening to UGC from a UGC site. Suppose such a process is via the Web interface 123. The process includes the consumer process attempting to access uploaded and authorized content. The result includes performing any use-time actions associated with the content. In more detail, in a step 141, the content consuming process requests the content through the Web interface coupled to a viewing rules processor 121 which is coupled to the site database, e.g., in the form of a process running on the UGC site processing system that includes at least one processor and a storage subsystem that includes instructions that when executed cause carrying out rules processing step 145. The rules processing step 145 includes fetching access-time actions associated with the requested content, the fetching being from the site database 113. The rules processing step 145 further includes filtering the fetched access-time actions and executing the actions post filtering. In results of executing the actions are used in rules processing step 145 to determine the content that is to be returned to the consumer.

Step 143 includes providing the content according to the executed action to the consumer.

Description of a Network

Figure 2:
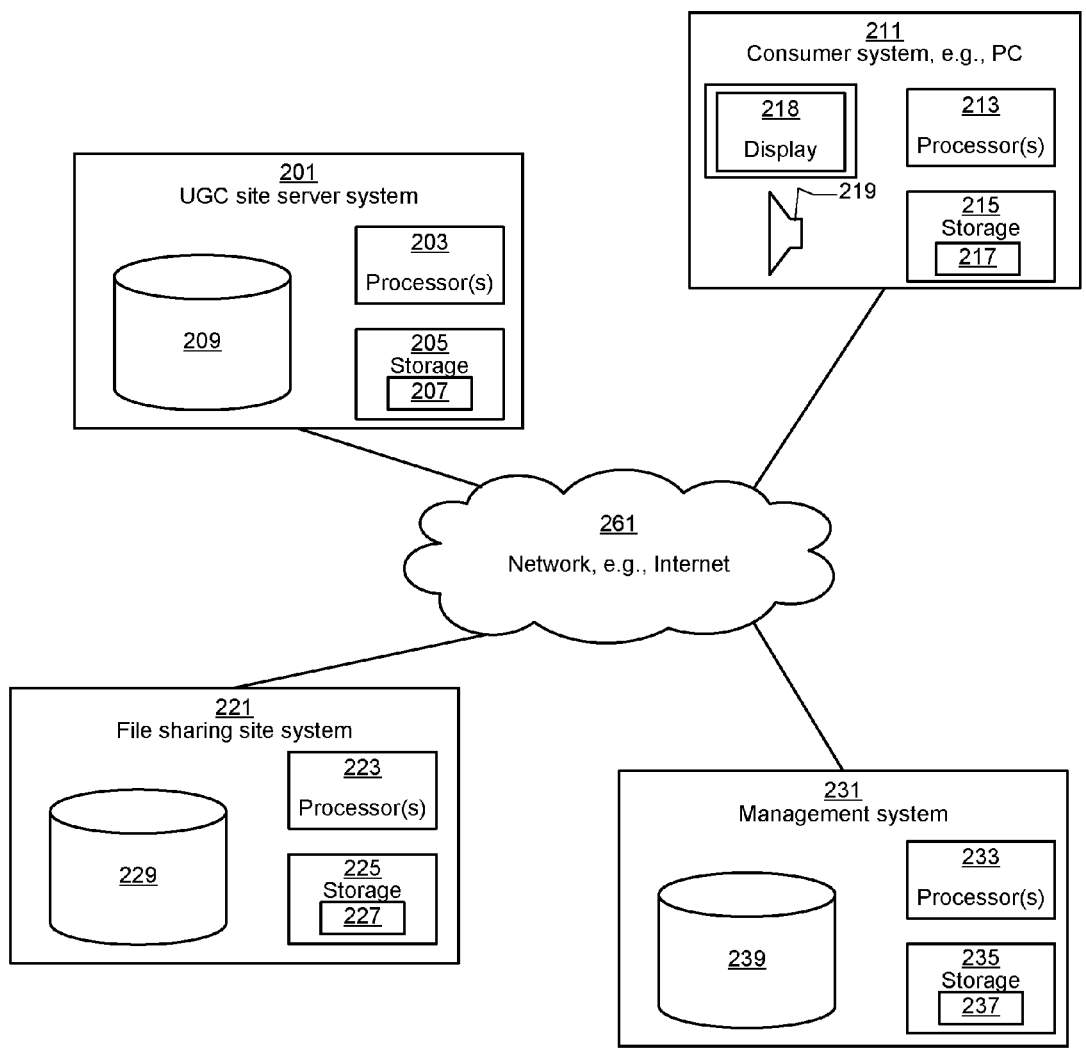
FIG. 2 shows a network with some processing systems coupled thereto, in which an embodiment of the present invention can operate.

FIG. 2 shows some of the elements of an overcall system, shown here coupled by a network 261 which typically but not necessarily is a public network such as the Internet. The system includes a consumer processing system 211, e.g., a PC that is coupled to the network 261 and that includes one or more processors 213, a display 218, an audio device 219; and a storage subsystem 215 that typically includes a memory. Not shown are such common elements as a network interface, keyboard, pointing device, and so forth in order not to obscure the main features. The storage subsystem 215 includes instructions 217 such that at least part of the storage subsystem forms the computer readable medium with instructions thereon that when executed carry out method steps that occur in the consumer system in different embodiments of the invention.

The system also includes a UGC site processing system 201 that is coupled to the network 261 and that can be at one location, or itself distributed, e.g., by another network, or the same network 261. The processing system 201 includes one or more processors 203, a storage subsystem 205 that includes a memory, and a database 209, e.g., in or coupled to the storage subsystem 205. The database includes the UGC, e.g., after processing during the upload process described above using FIG. 1. Not shown are such common elements as a network interface, keyboard, pointing device, and so forth in order not to obscure the main features. The storage subsystem includes instructions 207 such that at least part of the storage subsystem forms the computer readable medium with instructions thereon that when executed carry out method steps that occur in a UGC system in different embodiments of the invention.

Embodiments of the invention are also useful for filesharing sites, and thus, FIG. 2 includes a filesharing site system 221 that is coupled to the network 261 and that can be at one location, or itself distributed, e.g., by another network, or the same network 261. The processing system 221 includes one or more processors 223, a storage subsystem 225 that includes a memory, and a database 229, e.g., in or coupled to the storage subsystem 225. The database includes content files for sharing, e.g., after processing during the upload process described above using FIG. 1 (using a process analogous to the one described for UGC sites). Not shown are such common elements as a network interface, keyboard, pointing device, and so forth in order not to obscure the main features. The storage subsystem includes instructions 227 such that at least part of the storage subsystem forms the computer readable medium with instructions thereon that when executed carry out method steps that occur in a file sharing system in different embodiments of the invention.

The system embodiment shown in FIG. 2 also includes a management processing system 231 that is coupled to the network 261 and that can be at one location, or itself distributed, e.g., by another network, or the same network 261. The management system carries out many of the functions described above with the aid of FIG. 1. For example, the functions of recognition information generator 105, the rules validator 107 can be in one part of the system designed to provide rules acceptance services. The recognition system can be a separate system, or can be combined with the upload manager 117 and the upload rule analyzer 119, such a system possibly including the viewing rules processor that is coupled the UGC processing system 201 where the site database, in one embodiment, resides. For the purposes of this description, all these will be regarded as part of the management system 231. Those skilled in the art will understand that many distributed and less distributed implementations are possible. The processing system 231 includes one or more processors 233, a storage subsystem 235 that includes a memory, and a database 239, e.g., in or coupled to the storage subsystem 235. The reference database 109 and the rules database 111 in some embodiments are part of the same overall database 239, or itself distributed (this still described herein as the database 239). Not shown are such common elements as a network interface, keyboard, pointing device, and so forth in order not to obscure the main features. The storage subsystem includes instructions 237 such that at least part of the storage subsystem forms the computer readable medium with instructions thereon that when executed carry out method steps that occur in a system as described above (see FIG. 1) in different embodiments of the invention.

Note that FIG. 2 only shows a single consumer system. Those skilled in the art will understand that thousands or millions of such consumer systems may be coupled. A consumer system may be involved in upload, e.g., to a UGC site, or may be involved in viewing or otherwise consuming content, e.g., from a UGC site.

Description of Example Methods

Figure 3:
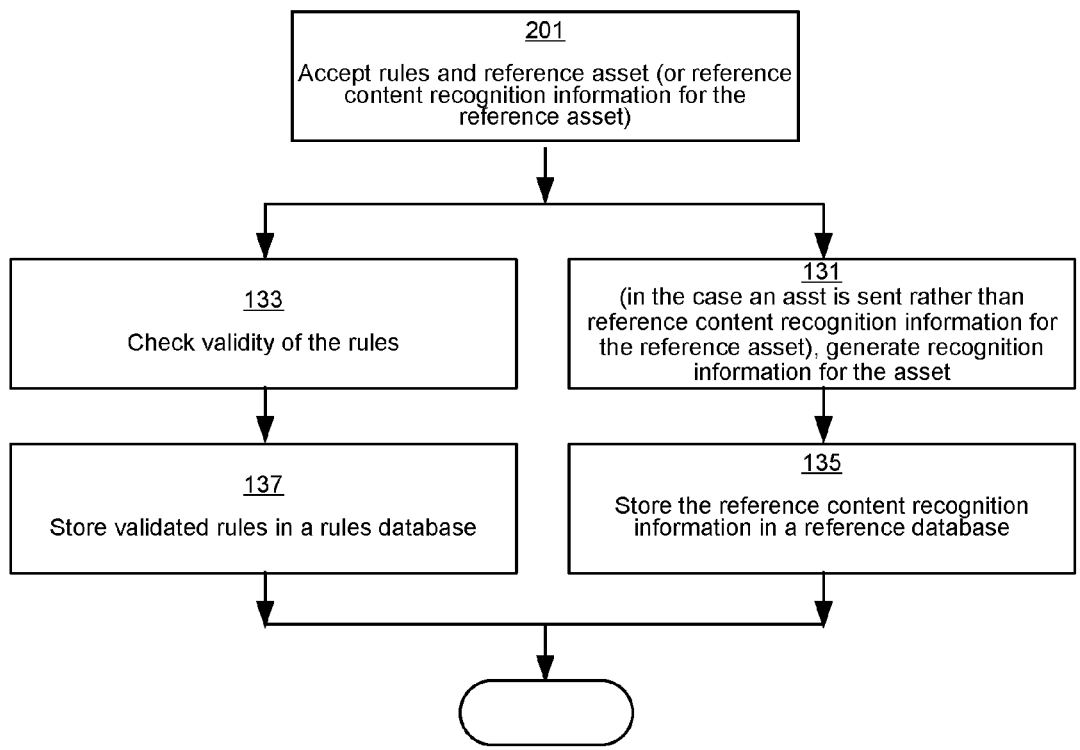
FIG. 3 shows in flowchart form some of the process steps carried out by the management system shown in FIG. 2 as a result of an asset and its associated ruled being submitted, in accordance to an embodiment of the present invention.

FIG. 3 shows a simplified flowchart of one method of operating a processing system, e.g., the management system of FIG. 2, to accept an asset, or data about an asset, and associated rules. The reader is also referred to FIG. 1.

In a step 201, an ingestion component 103 of the system receives rules and a reference asset. The rules are, in one embodiment, expressed in a computer-interpretable grammar that allow the expression of a range of possibilities for determination of recognition and a wide range of actions to take when such determination is made.

In a step 133, a rules validator 107 carries out validity checking on the rules.

In a step 137, the validated rules from the validation step 133 are stored in a rules database 111 that is maintained in storage by a processing system, e.g., the management system's storage subsystem.

With respect to the sent asset, step 131 includes, in the case the asset rather than reference asset recognition information is provided, a recognition information generator 105 generates reference asset recognition information for the reference asset. The content recognition information includes such information as one or more fingerprints, metadata, and/or one or more watermarks. In different embodiments, reference information for audio and video components of an asset may be generated separately. In some embodiments, step 131 is not used as the information is already presented to the system.

In a step 135, the reference asset recognition information for the asset is stored in a reference database 109.

How in some embodiments to modify the flowchart of FIG. 3 for the case of modifying rules, adding rules, and/or deleting rules would be straightforward to one of ordinary skill in the art from the information provided herein.

FIG. 4A shows one process of the management system (or elements thereof) that occurs in response to a consumer system uploading candidate content, e.g., via a Web interface provided by the system.

In a step 221, a front-end upload manager 117 accepts candidate content.

In a step 153, the upload manager 117 sends the candidate asset to a recognition system 115 (also called a candidate matcher herein). The recognition system 115 in 155 checks the candidate against the reference database or databases (collectively 109), and in 163, returns information about any matches to the upload manager 117.

In the case that there is any match information generated, e.g., information that there is an exact match, or less than an exact match, but still a form of a match, in a step 157, the upload manager 117 sends match information on the content to an upload rule manager, e.g., a rules processing system. In a step 159, the rules associated with the reference asset(s) that was/were matched by the recognition system 115 are fetched from the rules database 111 and evaluated for each matched reference asset.

Embodiments of the present invention provide for rules of different priority being available in the rules database for any reference asset. In some embodiments, step 159 includes determining the highest priority rule or rules that the detailed criteria of which have been met as a result of the identification by the recognition system 115, such determining being from the rule lists for any matched reference assets.

When recognition occurs, one or more actions take place according to the rules associated with the reference asset. Each rule has one or more associated actions. Not shown in FIG. 1 are the systems that carry out the actions in response to recognition and to the rules. For each rule, the associated actions are communicated to the action systems that perform or apply actions. It is possible that multiple rules will apply from multiple reference assets and that multiple actions will be triggered.

In a step 161, the upload rule analyzer sends or causes delivering allowable content and any use-time actions associated in accordance with the rules as a result of the matching. Such content and associated action-time actions (also called viewing rules) are delivered to site database 113 for the UGC site. Other actions also are possible as a result of the recognition.

Thus, content is uploaded to the site database 113 together with viewing rules associated with the content.

Consider now a consumer system requesting viewing UGC from a UGC site, and the process for receiving such a request. FIG. 4B shows a simplified flowchart for such processing at the management system. The process includes in step 231, the process at the management system receiving a request for the content, e.g., via a Web interface provided by the UGC site processing system. A rules processing step 145 includes fetching access-time actions associated with the requested content, the fetching being from the site database 113. The rules processing step 145 includes filtering the fetched access-time actions and executing the actions post filtering. In results of executing the actions are used in rules processing step 145 to determine the content that is to be returned to the consumer.

Step 143 includes providing the content according to the executed action to the consumer.

Recognition Systems

To support a baseline specification, one embodiment includes a content recognition system 115 that includes the following capabilities:

The ability to return an indication of the length of a reference asset matched.

The ability to return an indication of the amount of content in a reference asset matched between a site asset and a reference asset.

An indication of the component to which the match applies—audio, video, or both in the case of audio and video assets, and other indications when additional content type is included.

The ability to return the above information for all reference assets to which the site asset is successfully matched.

To support more capable implementations, some embodiments of the underlying recognition system return one or more additional items of information, including one or more of:

The length and position of a segment matched in a reference asset. The resolution of the time and length are system dependent, but the system should make a best effort attempt to meet the 1-second granularity of the specification.

A measure of quality of a match that indicated how certain the recognition system is of the match. In one embodiment, this is provided normalized to a linear scale of 0 to 100. A more limited recognition system that can only return a binary decision (yes or no to a match) would in such an overall implementation return 100 for yes, and 0 for no.

Recognizing content in accordance to the rules and generating one or more of the above indications is readily possible by straightforward manipulations of current content recognition systems, once the rules infrastructure described herein is available.

Note that the invention is not limited to any type of recognition system, and in general, any recognition method can be accommodated. Those skilled in the art will recognize the tradeoffs needed between a reasonable false positive rate and a reasonable false negative (missed matches) rate. Recognition and matching algorithms differ in the length of the content needed to attempt a match, the number or duration of individual matches needed to make a positive identification, and the reliability of identification.

Content Sites

In one embodiment, a content site such as a UGC site implements a whitelist for allowing authorized or privileged uploads. This is in order to meet the guidelines in UGC Principles. The management of that whitelist could be site-wide, per asset, or per rights holder.

Content sites also are assumed to have means for logging and auditing decisions and actions and emailing notifications to rights holders and consumers. These are outside the scope of this document.

It is not intended that reversal of takedown notices use the communication mechanism described here, and so such action is also outside the scope of this specification.

Topology of Different Embodiments

There is enough flexibility in the logical architecture to allow many possible implementations, even when the recognition rules are added into pre-existing systems. Existing content recognition systems and UGC sites are already individually complex, as are the interactions between them. Implementation concerns raised by the rules described herein might generally occur where those the rules systems and the existing recognition system and UGC site system interact with each other differently because of the addition of the rules mechanisms; or where pre-existing implementation decisions raise constraints around database design or connectivity across components. How to deal with such implementation issues would be clear to those skilled in the art, and is not described herein in order not to obscure the inventive aspects.

It should be noted that FIG. 1 does not show two systems that usually are included in a full implementation. The first is a system and associated method configured to dispatch actions to one or more action execution systems, and the second is a system configured to map among various possible ID domains, such as site-specific IDs, RuleList owner-specific IDs in content rules, and IDs used by recognition systems. Both of these not shown systems are simple and may already exist in most content recognition implementations. They are excluded from FIG. 1 so as not to obscure the inventive aspects.

For these descriptions, "local" and "external" mean "local/external to the UGC site."

While many variations are possible within the scope of the invention, the following three example implementations are referred to herein. No implication should be made, however, that the invention is limited to such three implementations.

Implementation 1: The content matching system with the reference database and the upload rules processing with the rules database are external; the exact actions to take when content is viewed are returned by the external system, in one embodiment as the XML-defined Action object defined in this document, are placed in the site database—in some versions after some pre-processing to meet the site's implementation needs—and used by the viewing rules processor. This model is similar to that used by some service providers today.

Implementation 2: The content matching system—or, less commonly, just the reference database—is external. The upload manager hands the result of the external matching process to the local upload-time rules processor, which applies rules from the local rules database. Steps subsequent to determining the Action to take are as in Case 1. This model is used when a UGC site outsources the matching activity to an external agent.

Implementation 3: All systems are local. This allows for tighter coupling, perhaps for reasons of control, performance, or coping with legacy systems; the viewing-time rules could be kept in the rules database rather than in the site database. Tight coupling may also make it easier to implement advanced features that are allowed by different implementations, such as holding an uploaded asset when an embargo for it is about to expire.

To repeat, there are of course various other ways of laying out the components within the scope of the invention.

Rule Ingestion and Storage

Preferred embodiments for communicating the rules from the rights holder include, but are not limited to using one or more protocols such as: File Transfer Protocol (ftp), including secure ftp, Secure Shell (SSH) protocol, Hypertext Transfer Protocol (HTTP), other means, such as providing a Really Simple Syndication (RSS) feed, e.g., using XML. In one embodiment, for non-secure protocols such as ftp and http, these communications are over a secure authenticated network link.

Some vendors of content recognition systems maintain recognition databases themselves and provide their customers with access to them via either a local copy, or remote communication. Some recognition systems generate and store the recognition information at the site where it will be used. Both of these schemes have commercial and technical merits and disadvantages; the system architecture of the present invention accommodates both of them.

The parts of the rules used when content is recognized and uploaded and the parts used when successfully uploaded content is accessed are logically separate, giving the system three logical data repositories.

These three repositories could be in one, two, or three data stores; such decision is partly based on which of the above described three implementations (implementation 1, implementation 2, or implementation 3) is used. There are some other considerations as well—a system with a single database is unlikely to occur, because the performance tuning needs of current recognition system typically require the recognition data to be stored in its own format and in its own systems. Determining whether to keep the recognition rules and the actions for content access together or separate further depends on a variety of factors. even in cases where the recognition rules and the actions could be kept together, such as Implementation 1 and Implementation 3 above, which has the virtue of simplicity, there might be performance requirements regarding access time in that separating them may be desirable.

Content Upload and Recognition

There are several ways of executing the rules for a piece of recognized content, depending on the recognition system, the database arrangements, and the communication paths available. It is expected that vendors of recognition systems will provide integration interfaces that allow for closer or looser coupling of their systems to the UGC site for reasons that are either commercial, e.g., providing a service vs. providing licensed software, or technical, e.g., gaining access to site-specific data.

When a candidate asset is accepted by the UGC site, the actions associated with the rules that it matched have to be associated with the asset and stored for access by the system that applies rules when content is accessed. See the above "Rule Ingestion and Storage" section for a discussion of possibilities for data repositories.

Finally, there may be some performance advantages to storing these access-time actions in a non-XML form that is simpler for the content serving system to parse and use.

Content Access

The process for providing content for viewing is what one would expect on a site. Additionally the actions associated with an individual site asset are applied. This way, a new mechanism is added to an existing site's infrastructure if the actions are stored separately from other information which the site stores regarding the asset. Examples of the other information include asset name, ID of the person who uploaded it, etc.

The evaluation and execution of the actions can be tightly or loosely coupled with the rest of the site's content serving system, with the same kinds of considerations as given above for execution of rules at upload time.

OTHER SCENARIOS

It can be seen that embodiments of the invention can be used in a system for purposes beyond the monitoring of UGC sites. For example, in a network where traffic is monitored, e.g., for bandwidth management or for detection of copyrighted content, logging messages and assertions of ownership of rights using the rules and methods described herein, can be used to calculate traffic volumes, which can then be used to determine bandwidth caps and fees. Individual recipients can also be charged for the content, or advertising can be inserted around it.

EXAMPLES

Informal

Informally, by way of example, different implementations of the system and method can support rules such as:
 a. On recognition of at least 60 seconds of this asset, please remove it from use.
 b. This asset is playable only in the US.
 c. This asset is not playable in the UK until Jul. 4, 2008.
 d. In a mash-up of multiple assets from the same series, if the total time of all assets from the series totals 3 minutes, then remove it from use.
 e. On appearance of this asset on a UGC site, send an email notification to the rights holder.
 f. When delivering an uploaded copy of this asset to a consumer, some ads or paid displays are associated with it and should be shown.
 g. If an uploaded video contains over 60 seconds from this movie, and that represents over 50% of the video's total length, quarantine it, pending investigation.
 h. If an uploaded video contains more than 33% of an original asset, take it down and notify the originator of the copy and the rights holder of the original.
 i. If an uploaded video contains an AACS theatrical use only watermark, send a DMCA notice.
 j. If the quality of an uploaded video is low enough, take no action.
 k. If the last 3 minutes of this show are found in uploaded content, replace the UGC with a teaser clip.
 l. If the uploaded clip contains more than 3 minutes from a reference asset, remove it; if it matches more than one minute, but less than 3 minutes, display a link to the rights holder's Web site alongside it; otherwise, do nothing.
 m. If an uploaded item matches a reference video, but has a different audio track, assert holding of copyright to the video but otherwise do nothing.

How Rules are Formally Specified

This section describes how rules are specified in some embodiments as a way of defining detection criteria and consequences of detection in content recognition systems, e.g., using metadata, fingerprinting and/or watermarking. Not included herein is how to implement the one or more actions that are the consequences of detection, or the action system(s) that achieve such actions. Many such systems and processes are known, and how to include such a system and the process steps would be clear to those skilled in the art.

External Data

The example rules described in detail herein, to be implemented, need the following to come from some external source:
 SiteAssetID—This comes from a local numbering system and is used to identify a candidate asset, e.g., an uploaded video in the context of the running system; "running system" could be the detection system itself or the system that is calling to it. The asset this refers to is called a "site asset."
 OriginatorID—This identifier determines the source of the site asset and describes the origin of the content identified by SiteAssetID. It might be a transaction ID, a session ID, a user ID, or some other opaque unique identifier.

OriginalAssetID—This is how the system refers to the asset to which rules are attached, and is given as a result after the matching system has run. It could be an ID internal to the matching system, or an ISAN, or some other ID specific to a site or an ISP. The asset this refers to can be thought of as a "master" asset, a "reference" asset, or the "matched" asset as well, depending on the terminology of the content identification system. It is the logical linkage between the Reference database and the Rules database.

GroupID—Some detection rules work across groups of content, e.g., all the episodes of a particular show. Rights holders who wish to use rules about groups must, of course, create the groups and assign assets to them. Groups must be named universally uniquely. The current specification allows groups to be based on UUIDs (which are highly likely to be unique, given a good UUID generator), ISANs (which are guaranteed to be unique), and URIs. Groups are not hierarchical, but an original asset can be part of more than one group.

Each of these is referenced in the specification, and each is assumed to be available at runtime as the rules are applied and actions performed.

It is also assumed that there are external systems that can transform OriginatorIDs, SiteAssetIDs, and OriginalAssetIDs into more complex data, e.g., URLs and user details; these will be used by the system processing the triggered actions.

Rules, Criteria, and Actions

Rules criteria and actions are described in this Section by examples. While the examples are somewhat fragmented, they are sufficiently complete to enable one of ordinary skill in the art to practice the invention.

RuleList Element, Asset Element, and Sub-Elements

A RuleList is the top-level construct. It contains some information about itself (name, validity information, etc), information about the entity that submitted it (called "the owner", for the sake of brevity), a list (a set) of reference assets denoted AssetList (and information about them), and a set of rules to apply to those reference assets at content recognition time.

The AssetList list of assets is a way of simplifying having the same rules apply to multiple pieces of content. After ingestion, the behavior for a RuleList that contains an AssetList asset list denoted $\{A_1, A_2, \ldots, A_n\}$ and a set of rules denoted R must be the same as the system had ingested n RuleLists individually containing asset list $\{A_1\}$ and rules R, asset list $\{A_2\}$ and rules R, ..., all the way through to asset list $\{A_n\}$ and rules R.

In some embodiments, a RuleList can be ingested independently of a reference asset. In one embodiment, after the initial ingestion of a RuleList, a new version can be submitted, which replaces the existing one (possibly subject to constraints). For example, the rules may be different before and after a movie's initial DVD release. This feature can also be used to provide different rules for a single item of a set, for example changing the rules for the last episode of a series, or providing different rules for which certain rights have not been cleared or are in dispute.

FIG. 5 describes in table form a RulesList element according to an embodiment of the present invention.

FIG. 6 describes in table form an Asset element according to an embodiment of the present invention.

FIG. 7 describes in table form some different asset identifiers (IDs), and how they are specified. IDs that are reasonably guaranteed to be unique, such as ISAN and UUIDs, have many advantages; types that do not guarantee uniqueness might be used, but caution is advised. The behavior of rules with non-unique asset IDs is unspecified and undefined, as is the behavior of rules for asset IDs that require external data to fully interpret.

FIG. 8 shows in table form an example of the Owner element that contains contact information about the owner, or entity submitting the rules. The email address or addresses will be used by some actions. Note however that not all content owners will want email for the rest of the items, and some UGC sites and recognition services provide information via secure ftp or RSS feeds instead. In the end, it is up to the content owner and site running the rules system to agree on a communication mechanism—these fields are present to provide a standard way of communicating some commonly requested information, not to dictate a particular workflow.

FIG. 9 shown in table form the TimeInterval element for describing duration. Such duration is expressed as a half-open interval of the form [start, end). It can be expressed as "after some date", "before some date", or "between two dates".

FIG. 10 shows the TimecodeRange element according to an embodiment of the invention, and is used for describing segments within an asset.

FIG. 11 shows the Group element used in some embodiments of the invention. An asset may be part of one or more groups, or of no group (the general term zero or more groups is used herein as is common in computer science). Each film in a movie franchise might be in the same group, e.g., there might be a group for the Hope and Crosby "Road" movies. Episodes of series might be in two groups—one for the season and one for the whole series. A group is usable to query whether or not a particular OriginalAssetID belongs to it; some rules are triggered based on group membership of original assets matched by a site asset.

If two assets have the value and type of one of their respective Group elements in common, then those two assets are both in that group. This is true for all group types; see below for an example that uses UUIDs. The value match must be exact—no extra parsing, truncating, or interpreting is done when determining group membership in this way.

Asset IDs of type "URI" and "ISAN" generate automatic or implicit group membership. In one embodiment, an implementation is allowed to turn the implicit group IDs into an explicit Group element and attach them to the Asset, which reduces the runtime test for group membership to string equality as described in the preceding paragraph.

In one embodiment, an original asset with an ISAN ID is automatically a member of the group defined by the root portion of the ISAN. This means that if all members of a series use the same ISAN root, there is no need to explicitly have a Group element in the Asset description. An explicit group of type "ISAN" can still be used, for example for assets that are transitioning from other form of ID to ISAN.

In one embodiment, for AssetIDs of type "URI", the asset is automatically a member of an implicit group named by the URI up to the last "/" character. For example an asset with and ID of type "URI" and value "//studio*dot*com/tv/series1/episode1" is in the group, where *dot* denoted a period. "//studio*dot*com/tv/series1," as is the asset with ID of type "URI" and value of "//studio*dot*com/tv/series1/episode2". The asset with ID of type "URI" and value "//studio*dot*com/tv/series2/episode1" is not in that group.

FIGS. 12A and 12B describe in table form a Rule element and its sub-elements according to an embodiment of the present invention. Each rule in the rule list is composed of detection criteria and actions, with an optional time window during which they are valid. This is specified in the Rule element.

In one embodiment, a missing DetectionCriteria element and a DetectionCriteria element with no sub-elements both count as empty sets of criteria and trigger the actions. If there are no successfully evaluated rules in the rule set with a higher priority. This can be used to provide a backstop action at the end of a series of decreasing priorities.

One embodiment of a system for processing rules is configured to:
  Evaluate all rules that have AlwaysProcess true, and execute them, ignoring the priorities.
  Evaluate the remaining rules in priority order; a rule with no DetectionCriteria or empty DetectionCriteria with priority no lower than the current priority counts as a successful rule execution.
  Stop evaluating individual rules once all the rules that match the priority of the first successful rule have been evaluated.

In one embodiment, the Include Segments and Exclude Segments can be used for excluding commercials from broadcast TV content, for example, or ignoring film excerpts included in review shows. If neither Include Segments nor Exclude Segments is specified, the entire reference asset is considered for the rule. If only Include Segments are specified, only those segments of the asset are considered for the rule. If only Exclude Segments are specified, the whole asset except for those segments is considered. If both are specified, the Include Segments with Exclude Segments removed are considered.

FIGS. 13A and 13B describe in table form a DetectionCriteria element according to an embodiment of the present invention.

Note that the criteria within an individual rule are ANDed together, and individual rules are done in order of priority.

FIG. 14 shows in simplified table form an Actions element according to an embodiment of the present invention.

FIG. 15 describes in table form the geographical information as what is denoted a CountryList element according to an embodiment of the invention. The rules and criteria are applied based on any CountryList in the Owner elements of the RuleList. Some of the actions may differ by location of the consumer; the underlying business models can be based on both "only in" (inclusion) and "everywhere but" (exclusion.) The actions express this using the CountryList element. With this element, any country not explicitly included is excluded; any country element not explicitly excluded is included. Often two actions will have the same country list, one with "include" and one with "exclude", for example one action to require ad support everywhere but in a particular set of countries and another to make the content unavailable for countries in that list.

FIG. 16 describes in table form some relatively simple actions with simple attributes and no sub-elements according to some embodiments of the invention.

More complex actions are described individually.

FIG. 17 describes in table form the TakeDown element for the action of taking down, according to an embodiment of the invention. Note that for the sake of brevity, some details are not shown. For example, an appeals and resolution process may be defined if the originator of the site asset contests the TakeDown action. A record might be kept of all TakeDown actions and the circumstances that led to them.

FIG. 18 describes in table form the LeaveUp action element for leaving an asset up. Included are none or more ExpiryActions. A reasonable action for ExpiryAction would be to quarantine the content. Sending a notification to the content owner would also be appropriate. In one embodiment, LeaveUp actions are logged if they have either an ExpiryAction (so the action can occur) or assertOwnership set to true.

FIG. 19 describes in table form the Quarantine action element to quarantine the content as a result of a match in accordance with some embodiments of the invention. Quarantine is useful, for example, when there is uncertainty about the proper disposition of the site asset. In some embodiments, quarantine actions are logged for tracking handling of the quarantine, and to provide a record of assertions of ownership.

As an example, a broadcaster might want to make its content available to residents of the UK, but not anywhere else. Note that this is done by excluding Great Britain from the countries to which not to provide the content, making it available there.

FIG. 20 describes in table form the AlternateContent action element for providing additional or alternate content or information, according to some embodiments of the invention. In some embodiments, all the attributes default to True, meaning that the alternate information is displayed with a link to the alternate content, alongside the site asset.

Content owners and UGC sites may come to agreements about the format and display of the text in AlternateInfo and the content pointed to by AlternateURL. Standardizing and encapsulating this information is a reasonable direction for future versions of this specification.

In some embodiments, the alternate content is taken from the Asset, and so is not itself geography dependent, although the use of it is. If geography-dependent alternate content is wanted, it can be provided via geofiltering at the site providing the alternate content.

FIG. 21 describes in table form the OwnerAdSupportedaction element to indicate that advertising is allowed in accordance with some embodiments of the invention. The content owner provides a URL as the way of getting ads to use around the content. The content owner and the site operator will need to have negotiated an agreement about formats, types, and delivery mechanism.

FIG. 22 describes in table form the SiteAdSupported element to indicate that site advertising is supported in accordance with some embodiments of the invention. Note that in this embodiment, SiteAdSupported does not have a URL; it is assumed that the site's notification system manages that internally, and there is nothing the content owner can supply other than the bare bones of the action. This is a simpler mechanism than the more general AdSupported action. Alternate embodiments can include more information.

FIG. 23 describes in table form the License element to indicate licensing as an action, in accordance with some embodiments of the invention.

FIGS. 24A-24C describe in table form a Notification element to indicate notification as a result of detection, in accordance with some embodiments of the invention. Such a Notification element contains information about actions or sets of actions and the RuleList, Rule, and DetectionCriteria that trigger them.

In some embodiments, sending one or more notifications includes the following features:
  If the detection criteria trigger more than one action, they are allowed to generate either one notification containing all the actions or one notification per action. It is preferred to send one notification containing all the actions.

All the criteria that trigger an action must be reported with the triggered action, and the notification must be sent only once, NOT once per criterion.

All fields for all met criteria must be set; if none of the criteria-related fields are set, the notification came from a rule with no detection criteria set.

Individual Rules operate independently of each other. After a content match and after detection criteria are met, notifications are sent for the highest priority rule or rules that have met their criteria (including rules with no DetectionCriteria at that priority), and rules with AlwaysProcess set to true. This may result in the sending of multiple Notification elements. Individual RuleLists operate independently of each other. This means that if a site asset triggers actions from two separate original (reference) assets—e.g., Star Wars and Saturday Night Live—then the Notification elements from both reference assets are sent.

Aggregated Rules. As seen in FIG. 13A, some embodiments include aggregated match criteria. An aggregate match criterion is a match criterion for multiple matches of multiple reference assets. Sometimes assets are viewed as components of a larger entity, such as episodes of a TV series or elements of an umbrella brand; content owners may care as much about the total amount of a series in a site asset as they do about the amount of any individual item from that series, and individual assets can be part of more than one group. The strength of this kind of connection can be seen in the prevalence of mashups on UGC sites—favorite or most important scenes from multiple episodes of a TV sitcom, strung-together footage from multiple installments of an action-adventure franchise, and so forth. For this purpose the elements MinAggregateLengthMatched and MinPercentOfSiteAssetAggregateMatching allow rules that deal with groups of reference assets. As an example, a rule might be to take the content down if it has more than 2 minutes of the original asset in it, and furthermore, to take the content down if it has more than 4 minutes of content in it from this asset or any other asset in its group. This also means that each element of a group that ends up triggering actions in an aggregate content match criterion will send Notification elements—e.g., if three sketches from three episodes of The Muppet Show are detected and their total time exceeds the time in an aggregated match rule three notification elements will be generated. Put another way, a Notification only ever has a single Asset and a single SiteAsset.

In some embodiments, requirements for acting on notifications include:

Actions in notification elements that have URLs must do an http POST to the URL with post data of notification=NotificationElement and, if the GenerateACNS element is present, additional post data of ACNS=<generated ACNS information>.

A record is kept of actions taken with infringing content, as outlined in one of the UGCPrinciples. The Notification Element is intended to contain sufficient information for this record, in addition to its role as a communication mechanism.

FIG. 25 describes in table form the WatermarkDetected element to indicate the value of the watermark, in a canonical form, in accordance with some embodiments of the invention.

FIG. 26 describes in table form the SiteAsset element to indicate data known about an Asset, in accordance with some embodiments of the invention.

In one embodiment, the time sub-elements on the SiteAsset element include one or more of:

TimeCreated—the creation time of the site asset (which may not be known),

TimeMatchRequested—the time at which the system decided that the asset needed to be scanned.

TimeMatchDetected—the time identification process completed.

A system that checks all uploaded video at upload time would have the first two fields very close to equal; the results for a batch process, such as described in the UGCPrinciples, might differ substantially. These three fields can be used to determine expeditiousness of detection processes.

Templates

One feature of some embodiments of the invention is provision for templates.

Templates enable the separate distribution of rule templates and lists of assets to which a template is applicable. This is useful, as an example, if a standard set of rules is pre-defined for all the episodes of a TV show, via a template, even those which have not yet been released. The template can be defined ahead of time and each episode can refer to that template as the episode becomes available. No new rule(s) need be created for each new episode. Thus, in some embodiments, the rules include rules specified as applicable to one or more reference assets indirectly specified by use of a template, such that by specifying that an asset belongs to a particular previously template, the one or more rules applicable to that asset are automatically specified.

A template defining a set of rules and identified by a template ID can indeed be treated as is it was an asset, and as such that can be included in a business workflow as an object or component with its own identifiers.

Templates affect which rules get associated with an asset, not the execution of the rules, and so are somewhat different from the other attributes and elements.

As already discussed herein above, FIG. 5 describes a RuleList element used embodiments of the invention. For those embodiments that allow for use of templates, the RuleList of FIG. 5 is modified to include an additional element used to indicate that the RuleList is for a template rather than for instances of one or more assets, and provides an identifier for the template. The additional element is an identifier for the template denoted templateID. Thus, for providing templates, an additional optional attribute is added to the RuleList element. FIG. 27 shows in table form the modification (additional RuleList element) of FIG. 5 to include templates.

For embodiments that provide for templates, when a RuleList does not include any templateID, it is a RuleList for asset instances, and when ingested, each asset in the included asset list receives its own copy of the included rule list. If any of the assets already have a rule attached (whether by reference to a template or as an instance), the new instance of the new rule replaces it. The rule used is the instance of the rule associated with the asset.

When a RuleList rule list (RuleList) that has a template identifier templateID and an AssetList sub-element is ingested, the RuleList rule list is installed as a template and the included assets refer to that template by reference. The resulting system behavior is the same as ingesting the RuleList rule list with the template ID templateID, and then ingesting an AssetsWithTemplate referring to that template.

When such a RuleList with a templateID is ingested, it is validated and saved in the database. If a RuleList with the same templateID already exists in the database, the existing RuleList is replaced with the new RuleList.

FIG. 28 describes in table form an AssetsWithTemplate element that is provided in some embodiments, and that is sent as a top-level entity. The assets in it retrieve rules from the template by reference.

When an AssetsWithTemplate is ingested, the existence of the template is checked; if the template does not exist, an error is returned. If it does exist, each Asset in the asset list included with AssetsWithTemplate is connected by reference to the template. If an asset in the included asset list already has a rule attached, either by reference or by instance, the reference to the template replaces it. When the asset is recognized, the template rule is looked up and used.

For providing templates, an additional optional attribute is added to the Notification element. FIG. 29 shows in table form the modification of a Notification element to include templates.

Ingestion Status

The inventors recognize that not all RuleLists will be ingested correctly; some will succumb to transmission errors, and some will have incorrect XML or conflicts with other rules. Some embodiments of the invention include automatic verification of the rules. In one embodiment, the following set of status codes are used as the result of verification:

Parsed—the RuleSet was valid XML, and parsed meaningfully. Since this is so, this status and its sub-status can return the Owner, RuleListName, and RuleListCreationTime from the RuleList.

Sub-status: success—the RuleList parsed correctly and the rules have been added to the system for the assets.

Sub-status: conflict—Even though the rules were parsed, there were unresolvable conflicts with other rules in the system. Notification about this should be sent to the NotifyConflict email address form the Owner element. Ideally, information about the conflicting assets will be returned as well. This does NOT count as successful ingestion, so no rules should be installed for any assets in the AssetList.

NotParsed—Some error happened, and the rules could not be parsed. This may not be able to return any information along with the status, but if anything is available—e.g., identifying information from the RuleList—such information should be returned.

MissingTemplate—If an AssetList is provided either with no template or a reference to a non-existent template, this error should be returned.

One set of different alternate embodiments include fewer error codes. Yet another set of alternate embodiments use more error codes. Yet another alternate embodiment uses different error codes, and how to include and implement such variations would be clear to one skilled in the art.

XML Schemas.

In one embodiment, the structures have schemas specified in XML. One embodiment includes three XSD files:

crGeneric.xsd: the schema for shared generic types.
rules.xsd: the schema for the RuleList XML document.
notification.xsd: the schema for the Notification XML document.

FIGS. 30A-30E show one embodiment of crGeneric.xsd, the schema for shared generic types.

FIGS. 31A-31C show one embodiment of rules.xsd, the schema for RuleList XML document. See the "Rules, Criteria, and Actions" section.

FIGS. 32A-32D show one embodiment of notification.xsd: the schema for the Notification XML document. See the "Notifying External Systems" Section.

There are some implementation details to note include that particular characters are to be provided using standard XML pre-defined entities. In one embodiment, when specifying period of time (dutation), specifications conforming to http://www*dot*w3*dot*org/TR/xmlschema-2/#duration are used. In one embodiment, when specifying Date and/or time of day, specifications conforming to http://www*dot*w3*dot*org/TR/xmlschema-2/#dateTime are used. Various standard ways of identifying assets are known. These include ISAN (International Standard Audiovisual Number) identifiers. These also include identifiers by the Coral Consortium, a cross-industry specification for interoperable digital rights management (DRM) systems, done with XML and providing good levels of abstraction for identifiers. See http://www*dot*coral-interop*dot*org. If ISAN identifiers are used, in one embodiment, an additional namespace is defined, e.g., using xmlns:isan=http://www*dot*isan*dot*org/ISAN/isan. An ISAN-based element then uses this defined namespace, e.g., <isan:ISAN . . . />. If Coral identifiers are used, an additional namespace is defined, e.g., by
xmlns:cor=http://www*dot*coral-interop*dot*org/arch/core/4-0.

A Coral-based element and all its inner elements then use the defined namespace, e.g.: <cor:resource . . . />. Other identifiers also are known, and the invention is not limited to using any particular identifier specification.

It will be clear to one skilled in the art that the use of a formal language for specifying rules, criteria, and actions makes it easy to extend the invention with new match criterion or criteria and/or action(s).

Thus systems and method have been described that include using rules, expressed in a computer interpretable language, that associate actions and recognition criteria with assets, and that is usable, e.g., in monitoring such sites as UGC sites.

While the example embodiments described herein are for UGC sites, embodiments of the invention also can be used types and locations for detected content, such as on an Internet service provider's network, where the Internet service provider could try to monetize the content, rather than block it, and for dealing with download sites rather than other UGC sites.

While the set of rules are expressed in XML as the computer-interpretable grammar, those skilled in the art will understand that the invention is in no way limited to sets of rules described using XML. For example, the structures may be described by C or C++ structures, or by any other computer interpretable language that defines data elements. In another embodiment, the OWL Web Ontology Language is used. See *OWL Web Ontology Language Guide*, Michael K. Smith, Chris Welty, and Deborah L. McGuinness, Editors, W3C Recommendation, version 10 Feb. 2004, retrieved 15 Jul. 2009 at http://www*dot*w3*dot*org/TR/2004/REC-owl-guide-20040210/. The latest version of the document is maintained at http://www*dot*w3*dot*org/TR/owl-guide/. Other embodiments use Resource Description Framework (RDF). See, for example, *RDF Primer*, version 20 Feb. 2004, retrieved 15 Jul. 2004 at http://www*dot*w3*dot*org/TR/REC-rdf-syntax/.

Note on Use of Data Structures

While the description above uses data structure terms such as database, list, schema, and tables, the invention is in no way limited to using such data structures. A list of one or more elements, for example, is to be understood to mean a set of one or more elements. Similarly, when a database is referred to, no explicit structure or schema should be assumed for those databases unless described in above for the particular embodiments.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

By a processing system is meant a system that includes one or more processors and a storage system. As used herein, a processing system may be local, or may be a distributed system. By a distributed system is meant a processing system that includes several processing systems that are coupled by one or more network links. The storage subsystem typically includes memory and may include one or more other memory elements. The storage subsystem may be local or distributed. A distributed storage subsystem includes several storage elements, at least some of which are remote coupled to the local processing system by a network.

Note that when a method is described that includes several elements, e.g., several steps, no ordering of such elements, e.g., steps is implied, unless specifically stated.

In some embodiments, a tangible computer-readable storage medium is configured with, e.g., encoded with instructions that when executed by one or more processors of a processing system, cause carrying out one or the set of method steps described herein.

The method steps described herein are, in some embodiments, performable by one or more processors that accept logic, e.g., computer-readable (also called machine-readable) instructions encoded on one or more computer-readable media. When executed by one or more of the processors, the instructions cause carrying out at least one of the methods described herein. Any processor capable of executing a set of instructions (sequential or otherwise) that specify actions to be taken are included. Thus, one example is a typical processing system that includes one or more processors. Each processor may include one or more of a CPU or similar processor element, a graphics processing unit, and/or a programmable DSP unit. The processing system further may include a storage subsystem that includes a memory subsystem including main RAM and/or a static RAM, and/or ROM. The storage subsystem furthermore may include one or more other storage elements such as one or more magnetic storage devices and/or optical storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The terms storage subsystem, storage device, or memory unit as used herein, if clear from the context and unless explicitly stated otherwise, also encompasses a storage system such as a disk drive unit.

The processing system in some configurations may include a sound output device, and a network interface device. The storage subsystem thus includes a tangible computer-readable medium that is configured with, e.g., encoded with instructions, e.g., logic, e.g., software that when executed by one or more processors, causes carrying out one of more of the method steps described herein. The software may reside in the hard disk, or may also reside, completely or at least partially, within the RAM and/or within the processor during execution thereof by the computer system. Thus, the memory and the processor also constitute computer-readable medium on which are encoded instructions.

Furthermore, a computer-readable storage medium with such instructions may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium configured with a set of instructions, e.g., a computer program when executed on one or more processors, e.g., one or more processors that are part of a system for monitoring content, cause carrying out of method steps. Thus, as will be appreciated by those skilled in the art, embodiments of the present invention may be embodied as a method, an apparatus such as a special purpose apparatus, an apparatus such as a data processing system, or a computer-readable storage medium, e.g., as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of computer readable medium, e.g., a computer program product on a computer-readable storage medium with computer-readable program code embodied in the medium.

While the computer readable medium is shown in an example embodiment to be a single medium, the term "computer readable medium" should be taken to include a single medium or multiple media, e.g., a centralized storage device for a centralized database, or distributed storage for a distributed database, and/or associated caches and servers that store the one or more sets of instructions. The term "computer readable medium" shall also be taken to include any tangible storage medium that is capable of storing or encoding instructions for execution by one or more of the processors and that cause the one or more processors to perform method steps of any one or more of the methodologies of the present invention. A computer readable medium may take many forms, including but not limited to, non-volatile media and/or volatile media. Non-volatile media includes, for example, optical storage, magnetic disks, and/or magneto-optical disks. Volatile media includes dynamic memory, such as main memory. For example, the term "computer readable medium" shall accordingly be taken to include, but not be limited to, in one set of embodiment, a tangible computer-readable medium, e.g., a solid-state memory, or a computer software product encoded in computer-readable optical or magnetic media.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any U.S. patent, U.S. patent application, or International patent application designating the United States cited herein is hereby incorporated by reference. Furthermore, in the case the Patent Rules or Statutes do not permit incorporation by reference material that itself incorporates information by reference, the incorporation by reference of the material excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

APPENDIX

The Principles for User Generated Content Services (UGCPrinciples) Published Jul. 30, 2008
Text Retrieved Jul. 30, 2008 at http://www*dot*ucprinciples*dot*com, where *dot* Denotes a Period (".") in the Actual URL Leading commercial copyright owners ("Copyright Owners") and services providing user-uploaded and user-generated audio and video content ("UGC Services") have collaborated to establish these Principles to foster an online environment that promotes the promises and benefits of UGC Services and protects the rights of Copyright Owners. In this context, UGC Services are services such as Soapbox on MSN Video, MySpace, Dailymotion and Veoh.com, and not other technologies such as browsers, applets, email, or search services. While we may differ in our interpretation of relevant laws, we do not mean to resolve those differences in these Principles, which are not intended to be and should not be construed as a concession or waiver with respect to any legal or policy position or as creating any legally binding rights or obligations. We recognize that no system for deterring infringement is or will be perfect. But, given the development of new content identification and filtering technologies, we are united in the belief that the Principles set out below, taken as a whole, strike a balance that, on a going-forward basis, will result in a more robust, content-rich online experience for all.

In coming together around these Principles, Copyright Owners and UGC Services recognize that they share several important objectives: (1) the elimination of infringing content on UGC Services, (2) the encouragement of uploads of wholly original and authorized user-generated audio and video content, (3) the accommodation of fair use of copyrighted content on UGC Services, and (4) the protection of legitimate interests of user privacy. We believe that adhering to these Principles will help UGC Services and Copyright Owners achieve those objectives.

1. UGC Services should include in relevant and conspicuous places on their services information that promotes respect for intellectual property rights and discourages users from uploading infringing content.
2. During the upload process, UGC Services should prominently inform users that they may not upload infringing content and that, by uploading content, they affirm that such uploading complies with the UGC Service's terms of use. The terms of use for UGC Services should prohibit infringing uploads.
3. UGC Services should use effective content identification technology ("Identification Technology") with the goal of eliminating from their services all infringing user-uploaded audio and video content for which Copyright Owners have provided Reference Material (as described below). To that end and to the extent they have not already done so, by the end of 2007, UGC Services should fully implement commercially reasonable Identification Technology that is highly effective, in relation to other technologies commercially available at the time of implementation, in achieving the goal of eliminating infringing content. UGC Services should enhance or update the Identification Technology as commercially reasonable technology that makes a meaningful difference in achieving the goal becomes available.

a. If a Copyright Owner has provided: (1) the reference data for content required to establish a match with user-uploaded content, (2) instructions regarding how matches should be treated, and (3) representations made in good faith that it possesses the appropriate rights regarding the content (collectively, "Reference Material"), then the UGC Service should apply the Identification Technology to that content to implement the Filtering Process described below. UGC Services should ensure that reasonable specifications, as well as any tools and/or technical support, for the delivery of Reference Material are made available to Copyright Owners. If a Copyright Owner does not include in the Reference Material instructions regarding how matches should be treated, the UGC Service should block content that matches the reference data.
b. The Identification Technology should use Reference Material to identify user-uploaded audio and video content that matches the reference data and should permit Copyright Owners to indicate how matches should be treated.
c. If the Copyright Owner indicates in the applicable Reference Material that it wishes to block user-uploaded content that matches the reference data, the UGC Service should use the Identification Technology to block such matching content before that content would otherwise be made available on its service ("Filtering Process"). The Copyright Owner may indicate in the applicable Reference Material that it wishes to exercise an alternative to blocking (such as allowing the content to be uploaded, licensing use of the content or other options), in which case, the UGC Service may follow those instructions or block the content, in its discretion.
d. Copyright Owners and UGC Services should cooperate to ensure that the Identification Technology is implemented in a manner that effectively balances legitimate interests in (1) blocking infringing user-uploaded content, (2) allowing wholly original and authorized uploads, and (3) accommodating fair use.
e. UGC Services should use the Identification Technology to block user-uploaded content that matches Reference Material regardless of whether the UGC Service has any licensing or other business relationship with the Copyright Owners who have provided such Reference Material (except that UGC Services may require that Copyright Owners enter into agreements with respect to the specifications for delivery of Reference Material that are commercially reasonable and that facilitate the provision of Reference Material by Copyright Owners and promote the goal of the elimination of infringing content). If a Copyright Owner authorizes specific users to upload content that would otherwise match Reference Material submitted by the Copyright Owner, the Copyright Owner should provide to the UGC Service a list of such users (a so-called white list).
f. UGC Services may, at their option, utilize manual (human) review of all user-uploaded audio and video content in lieu of, or in addition to, use of Identification Technology, if feasible and if such review is as effective as Identification Technology in achieving the goal of eliminating infringing content. If a UGC Service utilizes such manual review, it should do so without regard to whether it has any licensing or other business relationship with the Copyright Owners. Copyright Owners and UGC Services should cooperate to ensure that such manual review is implemented in a manner that effectively balances legitimate interests in (1) blocking infringing user-uploaded content, (2) allowing wholly original and authorized uploads, and (3) accommodating fair use.

g. Copyright Owners should provide Reference Material only with respect to content for which they believe in good faith that they have the appropriate rights to do so, and should update rights information as reasonable to keep it accurate. The inclusion of reference data for content by, or at the direction of, a Copyright Owner shall be deemed to be an implicit representation made in good faith that such Copyright Owner has the appropriate rights regarding such content. Copyright Owners should reasonably cooperate with UGC Services to avoid unduly stressing the Services' Identification Technology during limited periods when Copyright Owners, collectively, may be providing an overwhelmingly high volume of Reference Material. UGC Services should reasonably cooperate with Copyright Owners to ensure that such Reference Material is utilized by the Identification Technology as soon as possible during such overload periods.

h. Promptly after implementation of Identification Technology, and at intervals that are reasonably timed throughout each year to achieve the goal of eliminating infringing content, UGC Services should use Identification Technology throughout their services to remove infringing content that was uploaded before Reference Material pertaining to such content was provided.

i. Copyright Owners and UGC Services should cooperate in developing reasonable procedures for promptly addressing conflicting claims with respect to Reference Material and user claims that content that was blocked by the Filtering Process was not infringing or was blocked in error.

4. UGC Services and Copyright Owners should work together to identify sites that are clearly dedicated to, and predominantly used for, the dissemination of infringing content or the facilitation of such dissemination. Upon determination by a UGC Service that a site is so dedicated and used, the UGC Service should remove or block the links to such sites. If the UGC Service is able to identify specific links that solely direct users to particular non-infringing content on such sites, the UGC Service may allow those links while blocking all other links.

5. UGC Services should provide commercially reasonable enhanced searching and identification means to Copyright Owners registered with a service in order: (a) to facilitate the ability of such Copyright Owners to locate infringing content in all areas of the UGC Service where user-uploaded audio or video content is accessible, except those areas where content is made accessible to only a small number of users (not relative to the total number of users of the UGC Service), and (b) to send notices of infringement regarding such content.

6. When sending notices and making claims of infringement, Copyright Owners should accommodate fair use.

7. Copyright Owners should provide to UGC Services URLs identifying online locations where content that is the subject of notices of infringement is found—but only to the extent the UGC Service exposes such URLs.

8. When UGC Services remove content pursuant to a notice of infringement, the UGC Service should (a) do so expeditiously, (b) take reasonable steps to notify the person who uploaded the content, and (c) promptly after receipt of an effective counter-notification provide a copy of the counter-notification to the person who provided the original notice, and, at its option, replace the content if authorized by applicable law or agreement with the Copyright Owner.

9. When infringing content is removed by UGC Services in response to a notice from a Copyright Owner, the UGC Service should use reasonable efforts to notify the Copyright Owner of the removal, and should permit the Copyright Owner to provide, or request the UGC Service to provide on its behalf, reference data for such content to be used by the Identification Technology.

10. Consistent with applicable laws, including those directed to user privacy, UGC Services should retain for at least 60 days: (a) information related to user uploads of audio and video content to their services, including Internet Protocol addresses and time and date information for uploaded content; and (b) user-uploaded content that has been on their services but has been subsequently removed following a notice of infringement. UGC Services should provide that information and content to Copyright Owners as required by any valid process and consistent with applicable law.

11. UGC Services should use reasonable efforts to track infringing uploads of copyrighted content by the same user and should use such information in the reasonable implementation of a repeat infringer termination policy. UGC Services should use reasonable efforts to prevent a terminated user from uploading audio and/or video content following termination, such as blocking re-use of verified email addresses.

12. In engaging in the activities set forth in these Principles outside the United States, UGC Services and Copyright Owners should follow these Principles to the extent that doing so would not contravene the law of the applicable foreign jurisdiction.

13. Copyright Owners should not assert that adherence to these Principles, including efforts by UGC Services to locate or remove infringing content as provided by these Principles, or to replace content following receipt of an effective counter notification as provided in the Copyright Act, support disqualification from any limitation on direct or indirect liability relating to material online under the Copyright Act or substantively similar statutes of any applicable jurisdiction outside the United States.

14. If a UGC Service adheres to all of these Principles in good faith, the Copyright Owner should not assert a claim of copyright infringement against such UGC Service with respect to infringing user-uploaded content that might remain on the UGC Service despite such adherence to these Principles.

15. Copyright Owners and UGC Services should continue to cooperate with each other's reasonable efforts to create content-rich, infringement-free services. To that end, Copyright Owners and UGC Services should cooperate in the testing of new content identification technologies and should update these Principles as commercially reasonable, informed by advances in technology, the incorporation of new features, variations in patterns of infringing conduct, changes in users' online activities and other appropriate circumstances.

We claim:

1. A method of operating a processing system that includes one or more processors and a storage subsystem, the method comprising:

one or more of the set of processes consisting of:

a first process of ascertaining whether a candidate item of content at a particular recipient site is matched to one or more of a set of reference assets of content, the first process comprising:

accepting a candidate item of content or recognition information thereof;

comparing the accepted candidate item of content or the recognition information thereof with a set of reference assets of content using a set of rules, the rules stored in the storage subsystem in computer-interpretable form, the rules including for each reference asset of content one or more content match criteria for matching the candidate item of content with said each reference asset of content, the rules further including action rules for defining one or more actions to take in the case that there is a match with a reference asset of content according to a match criterion for the reference asset, wherein the content match criteria for at least one reference asset of content include a plurality of content match criteria for matching, such that different actions are defined in the action rules for different ones of the plurality of match criteria, and wherein at least one match criterion in the rules is such that the matching includes ascertaining a degree of recognition; and in the case that there is a match according to a particular content match criterion, using a stored rule for the particular content match criterion to ascertain what action or actions to take for the match, and a second process comprising accepting one or more rules for one or more reference assets, the one or more rules including for each reference asset of content one or more content match criteria for matching a candidate item of content with said each reference asset of content at a particular recipient site, the rules further including action rules for defining one or more actions to take in the case that there is a match with a reference asset of content according to a match criterion for the reference asset, wherein the content match criteria for at least one reference asset of content include a plurality of content match criteria for matching, such that different actions are defined in the action rules for different ones of the plurality of match criteria, and wherein at least one match criterion in the rules is such that the matching includes ascertaining a degree of recognition, the second process further comprising storing the one or more rules in the storage subsystem in computer-interpretable form, wherein for a reference item of content that includes audio and video components, separate rules can be provided for matching just the audio component and for matching just the video component.

2. A method as recited in claim 1, wherein the storing of the one or more rules is in a rules data structure, the second process further comprising:

accepting the one or more reference assets or asset recognition information for the one or more reference assets; and storing the one or more reference assets or asset recognition information in a reference asset data structure in the storage subsystem.

3. A method as recited in claim 2, wherein the stored rules data structure and the reference asset data structure are separately stored as separate data structures.

4. A method as recited in claim 2, wherein the stored rules data structure and the reference asset data structure are in a single combined data structure.

5. A method as recited in claim 1, wherein the second process further comprises carrying out validity checking on the one or more rules.

6. A method as recited in claim 1, wherein the first process further includes, in the case that there is a match using a match criterion, causing to take place the one or more actions to take for the match criterion being met.

7. A method as recited in claim 1, wherein the first process further includes, in the case that there is a match using a match criterion, causing to take place the one or more actions to take for the match criterion being met, including communicating the one or more actions to take.

8. A method as recited in claim 1, wherein the comparing results for at least one match criterion includes ascertaining a degree of recognition, and wherein different actions are defined in the action rules for different degrees of recognition.

9. A method as recited in claim 1, wherein at least one action is designed to take place upon upload to a recipient site or an attempt thereof the upload or attempt thereof causing the at least one action to be performed.

10. A method as recited in claim 1, wherein at least one action is designed to take place upon an attempt to consume uploaded content, the attempt causing the at least one action to be performed.

11. A method as recited in claim 1, wherein the stored rules for some particular reference assets of content that have audio and video components include one or more audio match criteria and one or more separate video match criteria, such that matching is possible of a candidate item for just the respective audio components or of just the respective video components of the particular reference assets of content that have audio and video components.

12. A method as recited in claim 1, wherein the storage subsystem is distributed.

13. A method as recited in claim 1, wherein the stored rules include one or more rules specified as applicable to one or more reference assets of content indirectly specified by a template, such that by specifying that a particular reference asset belongs to a particular previously specified template, the one or more rules specified as applicable to the particular reference asset are automatically specified.

14. A method as recited in claim 1, wherein the rule for each reference asset of content includes a rule owner.

15. A method as recited in claim 1, wherein the rule for each reference asset of content includes a rule owner, and wherein the rule for each reference asset of content and each rule owner further includes a specification indicative of which geographic region or regions ownership applies and/or in which region or regions the ownership does not apply.

16. A method as recited in claim 1, wherein the rule for each reference asset of content further includes a priority such that upon a match of more than one match criterion for a candidate item of content, the rules for which there is a match are applied in order of priority.

17. A method as recited in claim 1, wherein particular action rules in the case that there is a match with a particular reference asset of content define a plurality of particular actions, the particular actions having respective priorities, such that the particular actions are applied in order of priority.

18. A method as recited in claim 1, wherein the rule for each reference asset of content optionally includes specifying geographical region match criteria indicative of in which region or regions the rule applies and/or in which region or regions the rule does not apply.

19. A method as recited in claim 1, wherein the rule for each reference asset of content optionally includes specifying temporal match criteria indicative of one or more time windows within which the rule is valid and should be applied and/or one or more time windows within which the rule is invalid and is not to be applied.

20. A method as recited in claim 1, wherein the one or more actions for a match depend on when the match occurs relative to a date specified for the reference asset of content.

21. A method as recited in claim 1, wherein the stored rules provide in the case there is a match an indication of the amount of the reference asset of content matched, and wherein the one or more actions to take for any match include at least one action that depends on the indication of the amount of the reference asset of content matched.

22. A method as recited in claim 1, wherein stored rules provide in the case there is a match an indication of the amount of the reference asset of content matched, and wherein the one or more actions to take for any match include at lease one action that depends on the indication of the amount of the reference asset of content matched and on when the match occurs relative to a date specified for the reference asset of content.

23. A method as recited in claim 1, wherein the stored rules include a plurality of sets of one or more rules for a single set of one or more reference assets of content for a single owner, such that a particular reference asset of content having a particular owner can have different one or more rules stored depending on the particular recipient site.

24. A method as recited in claim 1, wherein the stored rules include an aggregate content match criterion applicable to a group of reference assets, such that one or more particular actions are triggered in the case of a match satisfying the aggregate content match criterion for one or a plurality of the reference assets of the group.

25. A method as recited in claim 1, wherein the stored rules are expressed in XML.

26. A method as recited in claim 1, wherein the stored rules are expressed in at least one of the set consisting of XML, OWL, and RDF.

27. A method as recited in claim 1, wherein the stored rules support release windowing by geography, or release windowing by time, or release windowing by both time and geography.

28. A method as recited in claim 1, wherein the stored rules support release windowing by time and by amount of content, such that one or more actions can change over time and according to how much of a reference asset of content is recognized.

29. A method as recited in claim 1, wherein the different actions defined in the stored rules include remove, allow, license, and replace.

30. A processing system comprising:
one or more processors;
a storage subsystem,
wherein the storage subsystem is configured with one or more computer-interpretable rules for one or more reference assets of content, the one or more rules defining for a particular reference asset of content one or more match criteria to determine whether there is a match of a candidate item of content at a particular recipient site with the particular reference asset of content and one or more actions to take for any match according to the matched match criterion,
wherein the content match criteria for at least one reference asset of content include a plurality of content match criteria for matching, such that different actions are defined in the action rules for different ones of the plurality of match criteria,
wherein at least one match criterion in the rules is such that the comparing includes ascertaining a degree of recognition;
wherein for a reference item of content that includes audio and video components, separate rules can be provided for matching just the audio component and for matching just the video component, and
wherein the storage subsystem is configured with instructions that when executed cause the processing system to carry out one or more of the set of processes consisting of:
a first process of receiving and storing an additional one or more reference assets of content or asset recognition information for the additional one or more reference assets, and an additional set of one or more rules for the additional one or more reference assets;
a second process of receiving and storing an additional set of one or more rules for one or more reference assets of content for which at least one rule already is stored; and
a third process of accepting a candidate item of content and processing one or more of the rules responsive to the candidate item of content being accepted, wherein the processing includes activating a content recognition method according to the match criteria, and activating an action in the case the content recognition method indicates one or more matches.

31. A processing system as recited in claim 30, wherein the different actions defined in the rules include remove, allow, license, and replace.

32. A non-transitory computer-readable storage medium configured with instructions that when executed by one or more processors of a processing system that includes one or more processors and a storage subsystem, cause carrying out of a method comprising:
one or more of the set of processes consisting of:
a first process of ascertaining whether a candidate item of content at a particular recipient site is matched to one or more of a set of reference assets of content including:
accepting a candidate item of content or recognition information thereof;
comparing the accepted candidate item of content or the recognition information thereof with a set of reference assets of content using a set of rules, the rules stored in the storage subsystem in computer-interpretable form, the rules including for each reference asset of content one or more content match criteria for matching the candidate item of content with said each reference asset of content, the rules further including action rules for defining one or more actions to take in the case that there is a match with a reference asset of content according to a match criterion for the reference asset, wherein the content match criteria for at least one reference asset of content include a plurality of content match criteria for matching, such that different actions are defined in the action rules for different ones of the plurality of match criteria, and wherein at least one match criterion in the rules is such that the matching includes ascertaining a degree of recognition; and
in the case that there is a match according to a particular content match criterion, using a stored rule for the particular content match criterion to ascertain what action or actions to take for the match, and a second process including accepting one or more rules for one or more reference assets, the one or more rules defining for a particular reference asset of content one or more match criteria to determine whether there is a match to a match criterion of a candidate item of content at a particular recipient site, and one or more actions to take for any match and the match criterion matched, wherein the content match criteria for at least one reference asset of content include a plurality of content match criteria for matching, such that different actions are defined in the action rules for different ones of the plurality of match criteria, and wherein at least one match criterion in the rules is such that the matching includes ascertaining a degree of recognition, the second process further including storing the one or more rules in the storage subsystem in computer-interpretable form, wherein for a reference item of content that includes audio and video components, separate rules can be provided for matching just the audio component and for matching just the video component.

33. A non-transitory computer-readable storage medium as recited in claim 32, wherein the different actions defined in the rules include remove, allow, license, and replace.

\* \* \* \* \*